(12) United States Patent
Mangold et al.

(10) Patent No.: US 11,491,757 B2
(45) Date of Patent: Nov. 8, 2022

(54) HOLLOW BODY HAVING A WALL WITH A LAYER OF GLASS AND AT LEAST ONE ELEVATED REGION

(71) Applicant: Schott AG, Mainz (DE)

(72) Inventors: Stephanie Mangold, Klein-Winternheim (DE); Eveline Rudigier-Voigt, Mainz (DE); Tamara Sweeck, Bad Kreuznach (DE)

(73) Assignee: Schott AG, Mainz (DE)

( * ) Notice: Subject to any disclaimer, the term of this patent is extended or adjusted under 35 U.S.C. 154(b) by 353 days.

(21) Appl. No.: 16/408,997

(22) Filed: May 10, 2019

(65) Prior Publication Data

US 2019/0343720 A1 Nov. 14, 2019

(30) Foreign Application Priority Data

May 11, 2018 (EP) .................................... 18171783

(51) Int. Cl.
*B32B 1/02* (2006.01)
*B32B 3/08* (2006.01)
(Continued)

(52) U.S. Cl.
CPC ............... *B32B 3/085* (2013.01); *A61J 1/065* (2013.01); *A61J 1/1468* (2015.05); *B32B 1/02* (2013.01);
(Continued)

(58) Field of Classification Search
CPC .... B32B 1/02; B32B 3/00; B32B 3/02; B32B 3/08; B32B 3/085; B32B 3/10;
(Continued)

(56) References Cited

U.S. PATENT DOCUMENTS 2,517,604 A 8/1950 Smith
3,418,153 A 12/1968 Levene
(Continued)

FOREIGN PATENT DOCUMENTS

DE 690 545 4/1940
DE 10 2009 042 159 A1 9/2011
FR 2 560 869 9/1985

OTHER PUBLICATIONS

Chinese Office Action, including an English translation, dated Dec. 2, 2021 for Chinese Application No. 201910388325.4 (22 pages).
(Continued)

*Primary Examiner* — Walter Aughenbaugh
(74) *Attorney, Agent, or Firm* — Taylor IP, P.C.

(57) ABSTRACT

A hollow body includes a wall which at least partially surrounds an interior volume of the hollow body. The wall comprises a layer of glass comprising a first glass composition, comprises a base surface, and has a wall surface. The wall surface comprises at least one surface region, in which the base surface is at least partially superimposed by at least one elevated region, and at least one contact region, which extends along a contact range of a height of the hollow body. The at least one elevated region comprises a further glass composition. An exterior diameter of the hollow body has a maximum throughout the contact range. The at least one surface region is at least partially positioned in the at least one contact region.

14 Claims, 9 Drawing Sheets

(51) Int. Cl.
*A61J 1/14* (2006.01)
*B65D 1/02* (2006.01)
*A61J 1/06* (2006.01)
*C03C 17/00* (2006.01)
*C03C 17/04* (2006.01)
*B32B 5/30* (2006.01)
*B32B 3/10* (2006.01)
*B65D 1/40* (2006.01)

(52) U.S. Cl.
CPC ............ *B32B 3/10* (2013.01); *B32B 5/30* (2013.01); *B65D 1/0215* (2013.01); *C03C 17/005* (2013.01); *C03C 17/04* (2013.01); *B65D 1/0207* (2013.01); *B65D 1/40* (2013.01); *C03C 2217/78* (2013.01)

(58) Field of Classification Search
CPC .. B32B 3/14; B32B 3/26; B32B 3/263; B32B 3/30; B32B 5/16; B32B 5/30; B65D 1/02; B65D 1/0207; B65D 1/0215; B65D 1/40; A61J 1/1468; C03C 17/30; C03C 2217/78; C03C 2218/111
See application file for complete search history.

(56) References Cited

U.S. PATENT DOCUMENTS

| | | |
|---|---|---|
| 4,223,365 A | 9/1980 | Moran |
| 4,420,578 A | 12/1983 | Hagens et al. |
| 6,511,753 B1 | 1/2003 | Teranishi et al. |
| 7,067,182 B2 | 6/2006 | Li et al. |
| 8,053,492 B2 | 11/2011 | Poe et al. |
| 9,034,442 B2 | 5/2015 | Chang et al. |
| 9,428,302 B2 | 8/2016 | Fadeev et al. |
| 9,668,936 B2 | 6/2017 | Fadeev et al. |
| 9,744,099 B2 | 8/2017 | Fadeev et al. |
| 9,763,852 B2 | 9/2017 | Fadeev et al. |
| 9,775,775 B2 | 10/2017 | Fadeev et al. |
| 10,117,806 B2 | 11/2018 | Chang et al. |
| 10,494,293 B2 | 12/2019 | Schwall et al. |
| 2014/0151370 A1* | 6/2014 | Chang ............... B65D 1/0215 220/62.15 |
| 2020/0325065 A1 | 10/2020 | Granger et al. |

OTHER PUBLICATIONS

Yunxia Chen et al., "Preparation and characterization of self-assembled alkanephosphate monolayers on glass substrate coated with nano-Ti02 thin film", Materials Research Bulletin 36, 2001, pp. 2605-2612 (8 pages).

Yoshinori Yamada et al., "Friction and Damage of Coatings Formed By Sputtering Polytetrafluoroethylene and Polyimide", Surface and Coatings Technology, 43/44 pp. 618-628 (11 pages).

Rebecca L. De Rosa et al., "Scratch Resistant Polyimide Coatings for Aluminosilicate Glass Surfaces", The Journal of Adhesion, vol. 78, 2002, pp. 113-127 (15 pages).

* cited by examiner

600

800

HOLLOW BODY HAVING A WALL WITH A LAYER OF GLASS AND AT LEAST ONE ELEVATED REGION

BACKGROUND OF THE INVENTION

1. Field of the Invention

The invention relates to a hollow body including a wall which at least partially surrounds an interior volume of the hollow body. Further, the invention relates to a process for making an item; to a hollow body, obtainable by that process; to a closed hollow body; to a process for packaging a pharmaceutical composition; to a closed hollow body, obtainable by this process; to a use of a hollow body for packaging a pharmaceutical composition; and to a use of a plurality of glass particles.

2. Description of the Related Art

Containers made from glass have been applied for transporting fluids and powders safely since several centuries. In the last decades, the arts in which glass containers are used for transporting fluids and powders have become increasingly diverse and sophisticated. One such art is the technical field of the present application: pharmaceutical packaging. In the pharmaceutical industry, glass containers—such as vials, syringes, ampules and cartridges—are applied as primary packaging for all kinds of pharmaceutically relevant compositions, in particular drugs, such as vaccines. Specifically in this art, the requirements put on the glass containers have become more and more sophisticated, recently.

Glass containers for pharmaceutical packaging are typically cleaned, sterilized, filled and closed, on an industrial scale in a line of processing, referred to as filling line herein. There is a need to increase a production rate of such a filling line in the art. This may be implemented by increasing a velocity of the filling line and/or by reducing shut down times due to disruptions of the processing. In the prior art, such disruptions are typically caused by the occurrence of breakage of glass containers during processing, in particular due to high transportation velocities on the filling line. If such breakage occurs, production has to be stopped, the line has to be cleaned thoroughly from particles and dust and then the system has to be readjusted before it is started again. Contamination of the glass containers with any kind of pharmaceutically relevant particles, in particular glass particles, or pharmaceutically relevant sub-stances has to be avoided strictly, in particular if parenterals are packaged.

Further, scratching of the glass surfaces of the containers has to be avoided as far as possible. Scratches on the container surface may hamper an optical inspection of the filled containers, in particular for the presence of pharmaceutically relevant particles. Further, scratching can lead to glass particles or dust being disassociated from the containers. These particles and dust may contaminate the containers on the filling line.

In general, attempts to solve the above problems by applying a coating to the container surface are known in the prior art. The requirements on such coatings are rather sophisticated. They have to withstand high temperatures which occur in a sterilization treatment referred to in the art as depyrogenation. Further, the coatings have to withstand low temperature treatments such as freeze drying. Even more, the coatings have to withstand washing processes, which include increased temperatures and mechanical influences. This means that the advantageous properties which the coating provides to the exterior surface of the container have to be maintained and, in addition, contamination of the container interior with any pharmaceutically relevant particle or substance from the coating has to be avoided. The preceding sophisticated requirements have led to the development of rather complex multilayer coatings of the prior art. Such multilayer coatings are typically complex and costly to apply and thus, run contrary to the need for high processing rates. Further, the coatings of the prior art typically involve organic compositions which could either contaminate the container interior or which could suffer from the above mentioned post-treatment procedures.

What is needed in the art is a way to at least partly overcome a disadvantage arising from the prior art.

SUMMARY OF THE INVENTION

Exemplary embodiments disclosed herein provide a glass container for pharmaceutical packaging which allows for an increase of a production rate of a filling line. Further, some exemplary embodiments disclosed herein provide a glass container for pharmaceutical packaging which allows for an increase of a processing speed of a filling line, or for a reduction of disruptions of a filling line, or both. Further, some exemplary embodiments disclosed herein provide a glass container for pharmaceutical packaging which shows a reduced tendency to being damaged or even broken while being processed on a filling line. Further, some exemplary embodiments disclosed herein provide a glass container for pharmaceutical packaging which shows an improved scratch resistance, in particular at at least a part of its exterior surface. Further, some exemplary embodiments disclosed herein provide a glass container for pharmaceutical packaging which has a surface from which less particles are detached upon a scratching. In some embodiments, one such container is provided, wherein the container is further suitable for an easy and reliable optical inspection after having been filled. In some embodiments, one such container is provided, wherein the container is further suitable for a post-treatment, for example a sterilization treatment, which may be effected as a high-temperature-treatment—such as a depyrogenation; or a washing process; or a low-temperature-treatment—such as a freeze drying. In some embodiments, one such container is provided, wherein the container does not show an increased tendency to being contaminated in a pharmaceutically relevant manner, e.g., the container shows a reduced tendency to being contaminated. The preceding contamination refers, in particular, to the presence of pharmaceutically relevant particles in the container interior. In some embodiments, one such container is provided, wherein the container does not have a multilayer coating on a surface, such as the exterior surface, of the glass container. In particular, no primer layer is needed here.

In some exemplary embodiments, a hollow body is provided that includes a wall which at least partially surrounds an interior volume of the hollow body. The wall comprises a layer of glass, comprising a first glass composition, has a wall surface, and comprises a base surface. The wall surface comprises at least one surface region, in which the base surface is at least partially superimposed by at least one elevated region, and at least one contact region, which extends along a contact range of a height of the hollow body. The at least one elevated region comprises a further glass composition. Throughout the contact range an exterior diameter of the hollow body has a maximum and the at least one surface region is at least partially positioned in the at least one contact region. In some embodiments, the least one surface region is fully positioned in the at least one contact region. In some embodiments, each surface region, in which the base surface is at least partially superimposed by at least one elevated region, comprising the further glass composition, is positioned in the at least one contact region, i.e., in some embodiments, each surface region according to the above definition is positioned in a contact region according to the above definition. In some embodiments, the base surface is a surface of a layer of the wall. In some embodiments, the base surface is positioned on a side of the layer of glass which faces away from the interior volume. In some embodiments, the wall surface is an outer surface of the wall, such as an exterior surface, which may be at least partially formed by the at least one elevated region and at least one region of the base surface which is not superimposed by the at least one elevated region.

In some embodiments, the at least one elevated region is transparent. The at least one elevated region may be transparent at least for light in the visible wavelength range. In some embodiments, each elevated region, which comprises the further glass composition and which superimposes the base surface, is transparent. The at least one elevated region may comprise no pigment, or no filler, or both. In some embodiments, the at least one elevated region comprises no, such as crystalline, particle. In some embodiments, the preceding particles are have a melting temperature which is above the further softening temperature of the further glass composition, such as by at least 10° C., by at least 20° C., or by at least 50° C. In some embodiments, the at least one elevated region comprises no colorant, in particular no pigment and no dye.

In some embodiments, the at least one surface region extends along at least 25%, such as at least 30%, at least 40%, at least 50%, at least 60%, at least 70%, at least 80%, at least 90%, at least 95%, or along a full length, of a circumference of the hollow body. In the case in which the at least one surface region extends along the full length of the circumference of the hollow body, the at least one surface region, may form a closed loop. In some embodiments, the at least one surface region extends cylindrically symmetric around the interior volume of the hollow body. The at least one surface region may be a ring-shaped circumferential region.

In some embodiments, the interior volume is in a range from 0.5 to 100 ml, such as from 1 to 100 ml, from 1 to 50 ml, from 1 to 10 ml, or from 2 to 10 ml.

In some embodiments, the hollow body is a container.

In some embodiments, the container is a packaging container for a medical or a pharmaceutical packaging good or both. The container may be a primary packaging container for a medical or a pharmaceutical packaging good or both. An exemplary pharmaceutical packaging good is a pharmaceutical composition. In some embodiments, the container is suitable for packaging parenterals in accordance with section 3.2.1 of the European Pharmacopoeia, 7th edition from 2011.

In some embodiments, the container is one selected from the group consisting of a vial, a syringe, a cartridge, and an ampoule; or a combination of at least two thereof.

In some embodiments, the at least one elevated region has a thickness in a range from 0.1 to 10 μm, such as from 0.5 to 8 μm, from 1 to 7 μm, from 2 to 6 μm, or from 3 to 5 μm, above the base surface.

In some embodiments, the at least one elevated region adjoins the base surface. The at least one elevated region may be joined to the base surface. In case the at least one elevated region is joined to the base surface, adhesion forces between the at least one elevated region and the base surface go beyond Van-der-Waals-forces.

In some embodiments, at least in the at least one surface region, such as across the full exterior surface or across the full wall surface, the base surface is a surface of the layer of glass.

In some embodiments, the wall surface comprises a first surface region in which the base surface is at least partially superimposed by at least one first elevated region, and a further surface region in which the base surface is at least partially superimposed by at least one further elevated region, the first surface region and the further surface region are at least partially positioned in the at least one contact region, the at least one first elevated region, or the at least one further elevated region, or both comprises the further glass composition, the first surface region and the further surface region are spatially distanced by at least 10%, such as at least 20%, at least 30%, at least 40%, or at least 50%, of the height of the hollow body. In some embodiments, the first surface region or the further surface region or both is fully positioned in the at least one contact region. Therein, the first and the further surface regions may be at least partially positioned in the same or different contact regions. In some embodiments, the wall surface comprises a first contact region, which extends along a first contact range of a height of the hollow body, and a further contact region, which extends along a further contact range of the height of the hollow body, throughout the first contact range and throughout the further contact range an exterior diameter of the hollow body has a maximum, the first surface region is at least partially positioned in the first contact region, the further surface region is at least partially positioned in the further contact region. Therein, exterior diameter can have a first maximum in the first contact range and a further maximum in the further contact range, or the same maximum can extend throughout the first and the further contact range. In some embodiments, the first surface region is fully positioned in the first contact region, or the further surface region is fully positioned in the further contact region, or both. The first surface region and the further surface region may be spatially distanced by at least 10%, such as at least 20%, at least 30%, at least 40%, or at least 50% of a height of the hollow body in a direction of the height of the hollow body. In some embodiments, the first surface region, or the further surface region, or both each extends along at least 50%, such as along at least 60%, along at least 70%, along at least 80%, along at least 90%, along at least 95%, or along a full length, of a circumference of the hollow body. In the case in which the first surface region, or the further surface region, or both each extends along the full length of the circumference of the hollow body, the corresponding surface region, or both surface regions may each form a closed loop. The first surface region, or the further surface region, or both may each extend cylindrically symmetric around the interior volume of the hollow body. In some embodiments, the first surface region, or the further surface region, or both each is a ring-shaped circumferential region. In some embodiments, a single first elevated region covers the base surface fully in the first surface region. Additionally or alternatively, a single further elevated region may cover the base surface fully in the further surface region. In some embodiments, the hollow body comprises exactly the preceding first and further surface region, and no other surface region of the wall surface, in which the base surface is at least partially superimposed by at least one elevated region, which comprises the further glass composition.

In some embodiments, the wall surface comprises an interior surface which faces the interior volume, and an exterior surface which faces away from the interior volume; the exterior surface comprising the at least one surface region. The exterior surface may comprise the first surface region and the further surface region. In some embodiments, no elevated region of the at least one elevated region is superimposed to the base surface on a side of the layer of glass which faces the interior volume. Hence, in some embodiments the interior surface does not comprise any of the elevated regions, which comprises the further glass composition. The interior surface may be a surface of the layer of glass. In some embodiments, the wall surface consists of the interior surface and the exterior surface. The exterior surface may be at least partially formed by the at least one elevated region and at least one region of the base surface which is not superimposed by the at least one elevated region.

In some embodiments, the at least one surface region forms at least 50%, such as at least 60%, at least 70%, at least 80%, or at least 90%, of a surface area of the exterior surface.

In some embodiments, the at least one surface region has a width which extends along the height of the hollow body and which is in a range from 1 to 80%, such as from 1 to 70%, from 1 to 60%, from 1 to 50%, from 1 to 40%, from 1 to 30%, or from 1 to 20%, in each case of the height of the hollow body.

In some embodiments, in the at least one surface region the base surface is at least partially superimposed by a plurality of elevated regions. The elevated regions of the plurality of elevated regions may form a pattern of mutually spaced regions, such as bumps or dots, on the base surface in the at least one surface region. Therein, the pattern may be regular or irregular. In case of a first and a further surface region, the first surface region may comprise a first plurality of elevated regions and the further surface region may comprise a further plurality of elevated regions, the elevated regions of the first and the further plurality each comprising the further glass composition. In some embodiments, the elevated regions of the plurality of elevated regions are identical in at least one selected from the group consisting of thickness, diameter, shape, transparency, and composition, or in a combination of at least two thereof.

In some embodiments, the elevated regions of the plurality of elevated regions are arranged on the base surface in a mutually spaced manner.

In some embodiments, in the at least one surface region each elevated region of the plurality of elevated regions is arranged on the base surface with a distance to the closest elevated region of the plurality of elevated regions in a range from 0.5 µm to 1 mm, such as from 1 to 500 µm. If the base surface is superimposed by a plurality of elevated regions in multiple coherent surface regions of the wall surface, the preceding may hold at least for the elevated regions of the plurality of elevated regions within one of the multiple coherent surface regions, such as for all the elevated regions of the plurality of elevated regions within each of the multiple coherent surface regions. Hence, the multiple coherent surface regions may be spaced from each other by a distance which is more than the preceding values.

In some embodiments, the elevated regions of the plurality of elevated regions have a diameter in a range from 5 to 2500 µm, such as from 5 to 2000 µm, from 5 to 1500 µm, from 5 to 1000 µm, from 50 to 800, or from 50 to 500 µm.

In some embodiments, the plurality of elevated regions covers 5 to 90%, such as 20 to 80%, 30 to 70%, or 40 to 60%, of the base surface in the at least one surface region. Hence, here the plurality of elevated regions superimposes the base surface in the at least one surface region of the wall surface at a cover ratio in the preceding range.

In some embodiments, the at least one elevated region fully covers the base surface in the at least one surface region. A single elevated region may cover the base surface in the at least one surface region fully. In some embodiments, the at least one elevated region extends along at least 50%, such as along at least 60%, along at least 70%, along at least 80%, along at least 90%, along at least 95%, or along a full length, of a circumference of the hollow body. In the case in which the at least one elevated region extends along the full length of the circumference of the hollow body, the at least one elevated region may form a closed loop. In some embodiments, the at least one elevated region extends cylindrically symmetric around the interior volume of the hollow body. In some embodiments, the at least one elevated region is a ring-shaped circumferential region.

In case of multiple surface regions, each surface region may comprise a single elevated region which covers the base surface in the corresponding surface region fully. In some embodiments, the wall surface comprises multiple surface regions, from which at least one first surface region comprises a single elevated region which covers this at least one first surface region fully. The wall surface may additionally comprise at least one further surface region which comprises a plurality of elevated regions which superimposes the base surface in that at least one further surface region at least partially.

In some embodiments, the first glass composition is different from the further glass composition.

In some embodiments, the first glass composition has a first softening temperature and the further glass composition has a further softening temperature, the further softening temperature being less than the first softening temperature. In some embodiments, the further softening temperature is less than first softening temperature by 25 to 400° C., such as 25 to 300° C., 50 to 200° C., or 50 to 100° C. Additionally or alternatively, the further softening temperature is in a range from the transformation temperature of the first glass composition to 500° C. above the transformation temperature of the first glass composition, such as from the transformation temperature of the first glass composition to 400° C. above the transformation temperature of the first glass composition, from the transformation temperature of the first glass composition to 350° C. above the transformation temperature of the first glass composition, or from the transformation temperature of the first glass composition to 300° C. above the transformation temperature of the first glass composition.

In some embodiments, the first glass composition is characterized by a first coefficient of linear thermal expansion which refers to temperatures of the first glass composition in a range from 20 to 300° C., the further glass composition being characterized by a further coefficient of linear thermal expansion which refers to temperatures of the further glass composition in a range from 20 to 300° C., an absolute value of a difference between the first and the further linear coefficient of thermal expansion being not more than 1 ppm/K, such as not more than 0.5 ppm/K or not more than 0.3 ppm/K.

In some embodiments, the further glass composition is characterized by one or more of the following proportions, with each proportion being based on the weight of the further glass composition and all proportions of the further glass composition sum up to 100 wt.-%:

A) one or more silicon oxides in a range from 44 to 75 wt.-%, such as from 6 to 65 wt.-%,
B) one or more, such as a single, aluminum oxides in a range from 0 to 25 wt.-%, such as from 0 to 20 wt.-%,
C) one or more, such as a single, boron oxides in a range from 0 to 40 wt.-%, such as from 0 to 30 wt.-%,
D) one or more, such as a single, lithium oxides in a range from 0 to 12 wt.-%,
E) one or more, such as a single, sodium oxides in a range from 0 to 18 wt.-%, such as from 0 to 15 wt.-%,
F) one or more, such as a single, potassium oxides in a range from 0 to 17 wt.-%,
G) one or more, such as a single, calcium oxides in a range from 0 to 17 wt.-%, such as from 0 to 12 wt.-%,
H) one or more, such as a single, magnesium oxides in a range from 0 to 12 wt.-%, such as from 0 to 9 wt.-%,
I) one or more, such as a single, barium oxides in a range from 0 to 38 wt.-%, such as from 0 to 27 wt.-%,
J) one or more, such as a single, strontium oxides in a range from 0 to 16 wt.-%, such as from 0 to 15 wt.-%,
K) one or more, such as a single, zinc oxides in a range from 0 to 70 wt.-%, such as from 0 to 20 wt.-%,
L) one or more, such as a single, titanium oxides in a range from 0 to 5 wt.-%,
M) one or more, such as a single, zirconium oxides in a range from 0 to 7 wt.-%, such as from 0 to 5 wt.-%,
N) one or more, such as a single, bismuth oxides in a range from 0 to 20 wt.-%,
O) one or more, such as a single, cobalt oxides in a range from 0 to 5 wt.-%,
P) one or more, such as a single, iron oxides in a range from 0 to 5 wt.-%,
Q) one or more, such as a single, manganese oxides in a range from 0 to 10 wt.-%,
R) one or more, such as a single, cerium oxides in a range from 0 to 3 wt.-%,
S) one or more, such as a single, arsenic oxides in a range from 0 to 1 wt.-%,
T) one or more, such as a single, antimony oxides in a range from 0 to 15 wt.-%,
U) fluorine in a range from 0 to 3 wt.-%,
V) water in a range from 0 to 3 wt.-%.

An exemplary silicon oxide is $SiO_2$. A exemplary aluminum oxide is $Al_2O_3$. An exemplary boron oxide is $B_2O_3$. An exemplary lithium oxide is $Li_2O$. An exemplary sodium oxide is $Na_2O$. An exemplary potassium oxide is $K_2O$. An exemplary calcium oxide is CaO. An exemplary magnesium oxide is MgO. An exemplary barium oxide is BaO. An exemplary strontium oxide is SrO. An exemplary zinc oxide is ZnO. An exemplary titanium oxide is $TiO_2$. An exemplary zirconium oxide is $ZrO_2$. An exemplary arsenic oxide is $As_2O_3$. An exemplary antimony oxide is $Sb_2O_3$. An exemplary bismuth oxide is $Bi_2O_3$. An exemplary cobalt oxide is CoO. An exemplary iron oxide is $Fe_2O_3$. An exemplary manganese oxide is MnO. An exemplary cerium oxide is $CeO_2$.

In some embodiments, the further glass composition is characterized by one or more of the following proportions, wherein each proportion is based on the weight of the further glass composition and all proportions of the further glass composition sum up to 100 wt.-%:
A) one or more, such as a single, silicon oxides in a range from 44 to 75 wt.-%, such as from 6 to 65 wt.-%,
B) one or more, such as a single, aluminum oxides in a range from 0 to 25 wt.-%, such as from 0 to 20 wt.-%,
C) one or more, such as a single, boron oxides in a range from 0 to 40 wt.-%, such as from 0 to 30 wt.-%,
D) one or more, such as a single, lithium oxides in a range from 0 to 12 wt.-%,
E) one or more, such as a single, sodium oxides in a range from 0 to 18 wt.-%, such as from 0 to 15 wt.-%,
F) one or more, such as a single, calcium oxides in a range from 0 to 17 wt.-%, such as from 0 to 12 wt.-%,
G) one or more, such as a single, magnesium oxides in a range from 0 to 12 wt.-%, such as from 0 to 9 wt.-%,
H) one or more, such as a single, barium oxides in a range from 0 to 38 wt.-%, such as from 0 to 27 wt.-%,
I) one or more, such as a single, strontium oxides in a range from 0 to 16 wt.-%, such as from 0 to 15 wt.-%,
J) one or more, such as a single, zinc oxides in a range from 0 to 70 wt.-%, such as from 0 to 20 wt.-%,
K) one or more, such as a single, titanium oxides in a range from 0 to 5 wt.-%,
L) one or more, such as a single, zirconium oxides in a range from 0 to 7 wt.-%, such as from 0 to 5 wt.-%,
M) one or more, such as a single, arsenic oxides in a range from 0 to 1 wt.-%,
N) one or more, such as a single, antimony oxides in a range from 0 to 15 wt.-%,
O) fluorine in a range from 0 to 3 wt.-%,
P) water in a range from 0 to 3 wt.-%.

Additionally or alternatively to the above issue B), the further glass composition may comprise one or more, such as a single, aluminum oxides at a proportion of at least 1 wt.-%, such as at least 2 wt.-%, based on the weight of the further glass composition. Additionally or alternatively to the above issue C), the further glass composition may comprise one or more, such as a single, boron oxides at a proportion of at least 1 wt.-%, such as at least 5 wt.-%, based on the weight of the further glass composition.

In some embodiments, the further glass composition is characterized by one or more of the following proportions, wherein each proportion is based on the weight of the further glass composition and all proportions of the further glass composition sum up to 100 wt.-%:
A) one or more, such as a single, silicon oxides in a range from 44 to 75 wt.-%, such as from 6 to 65 wt.-%,
B) one or more, such as a single, aluminum oxides in a range from 0 to 25 wt.-%, such as from 0 to 20 wt.-%,
C) one or more, such as a single, boron oxides in a range from 0 to 40 wt.-%, such as from 0 to 30 wt.-%,
D) one or more, such as a single, lithium oxides in a range from 0 to 12 wt.-%,
E) one or more, such as a single, sodium oxides in a range from 0 to 18 wt.-%, such as from 0 to 15 wt.-%,
F) one or more, such as a single, potassium oxides in a range from 0 to 17 wt.-%,
G) one or more, such as a single, calcium oxides in a range from 0 to 17 wt.-%, such as from 0 to 12 wt.-%,
H) one or more, such as a single, magnesium oxides in a range from 0 to 12 wt.-%, such as from 0 to 9 wt.-%,
I) one or more, such as a single, barium oxides in a range from 0 to 38 wt.-%, such as from 0 to 27 wt.-%,
J) one or more, such as a single, strontium oxides in a range from 0 to 16 wt.-%, such as from 0 to 15 wt.-%,
K) one or more, such as a single, zinc oxides in a range from 0 to 70 wt.-%, such as from 0 to 20 wt.-%,
L) one or more, such as a single, titanium oxides in a range from 0 to 5 wt.-%,
M) one or more, such as a single, zirconium oxides in a range from 0 to 7 wt.-%, such as from 0 to 5 wt.-%,
N) one or more, such as a single, bismuth oxides in a range from 0 to 20 wt.-%, O) one or more, such as a single, cobalt oxides in a range from 0 to 5 wt.-%, P) one or more, such as a single, iron oxides in a range from 0 to 5 wt.-%, Q) one or more, such as a single, manganese oxides in a range from 0 to 10 wt.-%, R) one or more, such as a single, cerium oxides in a range from 0 to 3 wt.-%, S) fluorine in a range from 0 to 3 wt.-%.

In some embodiments, the further glass composition comprises an alkali oxide selected from the group consisting of a sodium oxide, such $Na_2O$; a lithium oxide, such as $Li_2O$; and a potassium oxide, such as $K_2O$; or a combination of at least two thereof of at a proportion of least 1 wt.-%, based on the weight of the further glass composition.

In some embodiments, the further glass composition comprises one selected from the group consisting of a calcium oxide, such as CaO; a magnesium oxide, such as MgO; a barium oxide, such as BaO; a strontium oxide, such as SrO; a zinc oxide, such as ZnO; a zirconium oxide, such as $ZrO_2$; and a titanium oxide, such as $TiO_2$; or a combination of at least two thereof at a proportion of least 1 wt.-%, based on the weight of the further glass composition.

In some embodiments, the further glass composition is of a type selected from the group consisting of a glass which is free from alkali metals, a glass comprising at least one alkali metal, a silicate glass, a borosilicate glass, a zincsilicate glass, a zincborat glass, a bismuthboronsilicate glass, a bismuthborat glass, a bismuthsilicate glass, a phosphate glass, a zincphosphate glass, an aluminosilicate glass, and a lithiumaluminosilicate glass, or a combination of at least two thereof.

In some embodiments, the first glass composition is of a type selected from the group consisting of a borosilicate glass, an aluminosilicate glass, and fused silica; or of a combination of at least two thereof.

In some embodiments, the at least one surface region is characterized by a contact angle for wetting with water in a range from 0 to 45°, such as from 5 to 45° or 10 to 45°.

In some embodiments, the wall comprises from top to bottom of the hollow body a top region; a body region, which follows the top region via a shoulder; and a bottom region, which follows the body region via a heel. The body region may be a lateral region of the hollow body. In some embodiments, the body region of the wall forms a hollow cylinder. The top region may comprise or consist of from top to bottom of the hollow body a flange and a neck.

In some embodiments, one selected from the group consisting of the body region, the shoulder, and the heel, or a combination of at least two thereof comprises the at least one surface region. In case the wall surface comprises a first and a further surface region, the shoulder may comprise the first surface region at least partially, such as fully, and the heel comprises the further surface region at least partially, such as fully. In a case in which the at least one surface region is comprised by two or more of the preceding regions of the wall, each of these regions may comprise at least one coherent surface region. In some embodiments, the top region comprises no region of the wall surface in which the base surface is superimposed by an elevated region which comprises the further glass composition.

In some embodiments, throughout the body region a thickness of the layer of glass is in a range from ±0.3 mm, such as ±0.2 mm, ±0.1 mm, or ±0.08 mm, in each case based on a mean value of this thickness in the body region of the wall.

In some embodiments, throughout the body region a thickness of the layer of glass is in a range from 0.5 to 2 mm, such as from 0.6 to 1.7 mm or from 0.9 to 1.6 mm. In some embodiments, throughout the body region a thickness of the layer of glass is in a range from 0.9 to 1.1 mm or in a range from 1.5 to 1.7 mm.

In some embodiments, towards the interior volume the layer of glass is at least partially superimposed by an alkali metal barrier layer or by a hydrophobic layer or both.

In some embodiments, the interior volume comprises a pharmaceutical composition.

In some exemplary embodiments disclosed herein, a process for making an item is provided that comprises as process steps:

a) providing a hollow body comprising a wall which at least partially surrounds an interior volume of the hollow body, the wall comprising a layer of glass comprising a first glass composition, and having a wall surface comprising at least one surface region and at least one contact region, which extends along a contact range of a height of the hollow body, throughout the contact range an exterior diameter of the hollow body has a maximum, the at least one surface region being at least partially positioned in the at least one contact region;

b) contacting the wall surface across the at least one surface region with a composition, comprising a plurality of particles, the particles of the plurality of particles comprising a further glass composition; and c) forming at least one elevated region from the composition and joining the at least one elevated region to the wall surface in the at least one surface region.

In some embodiments, the least one surface region is fully positioned in the at least one contact region. Each surface region, across which the wall surface is contacted with the composition in the process step b), may be positioned in the at least one contact region, i.e. each surface region according to the above definition is positioned in a contact region according to the above definition. In some embodiments, the contact region is a region of the wall surface which faces away from the interior volume. The above forming and joining steps may be conducted one after the other, in temporal overlap, or simultaneously. The at least one elevated region may comprise the further glass composition. In some embodiments, the layer of glass consists of the first glass composition. The particles of the plurality of particles may consist of the further glass composition. Additionally or alternatively, the at least one elevated region consists of the further glass composition. In some embodiments, the composition further comprises one selected from the group consisting of a vehicle, a viscosity adjusting agent, at least one colorant, and at least one filler, or a combination of at least two thereof. Additionally or alternatively, the at least one elevated region further comprises the at least one colorant, or the at least one filler, or both. In some embodiments, the composition consists of the plurality of particles and a vehicle, wherein the at least one elevated region consists of the further glass composition. An exemplary colorant is a pigment, or a dye, or both. In some embodiments, the first glass composition and the further glass composition are identical. The particles of the plurality of particles may be glass particles, such as glass frits. In some embodiments, the first glass composition is the first glass composition of the previously described hollow body. Additionally or alternatively, the further glass composition is the further glass composition of the previously described hollow body. The joining in the process step c) may comprise increasing adhesion forces between the at least one elevated region and the wall surface beyond Van-der-Waals-forces.

In some embodiments, the at least one elevated region is transparent. The at least one elevated region may be transparent at least for light in the visible wavelength range. In some embodiments, the composition is transparent, such as at least for light in the visible wavelength range. In some embodiments, the composition comprises no pigment, or no filler, or both. Further, in some embodiments the composition comprises no, such as crystalline, particle which has a melting temperature which is above a softening temperature of the further glass composition, such as by at least 10° C., by at least 20° C., or by at least 50° C. In some embodiments, the composition comprises no colorant, in particular no pigment and no dye.

In some embodiments, the at least one surface region extends along at least 50%, such as along at least 60%, along at least 70%, along at least 80%, along at least 90%, along at least 95%, or along a full length, of a circumference of the hollow body. In the case in which the at least one surface region extends along the full length of the circumference of the hollow body, the at least one surface region may form a closed loop. In some embodiments, the at least one surface region extends cylindrically symmetric around the interior volume of the hollow body. In some embodiments, the at least one surface region is a ring-shaped circumferential region.

In some embodiments, in the process step c) the forming or the joining or both comprises at least partially heating the particles of the plurality of particles above a softening temperature of the further glass composition. The softening temperature of the further glass composition is referred to herein also as the further softening temperature. In some embodiments, in the process step c) the forming or the joining or both comprises at least partially heating the particles of the plurality of particles to a temperature which is not more than a softening temperature of the first glass composition, such as not more than a temperature which at least 1° C. below the softening temperature of the first glass composition, not more than a temperature which is at least 3° C. below the softening temperature of the first glass composition, not more than a temperature which is at least 5° C. below the softening temperature of the first glass composition, or not more than a temperature which is at least 10° C. below the softening temperature of the first glass composition. The softening temperature of the first glass composition is also referred to herein as the first softening temperature.

In some embodiments, in the process step c) the further glass composition is heated to a temperature in a range from 200 to 650° C., such as from 300 to 650° C., from 400 to 650° C., or from 500 to 650° C. In some embodiments, in the process step c) the temperature of the further glass composition is kept in the preceding range for 2 to 20 min, such as for 5 to 15 min or for 5 to 10 min.

In some embodiments, the process step c) is at least in part conducted simultaneously to a stress relief operation to the layer of glass. An exemplary stress relief operation is a thermal stress relief.

In some embodiments, in the process step b) the composition further comprises a vehicle, the process step c) further comprising decreasing a proportion of the vehicle in the composition. In some embodiments, in the process step c) the proportion of the vehicle in the composition is decreased by at least 50 wt.-%, such as by at least 60 wt.-%, by at least 70 wt.-%, by at least 80 wt.-%, by at least 90 wt.-%, by at least 95 wt.-%, or by at least 99 wt.-%, in each case based on a proportion of the vehicle in the composition in the process step b). In some embodiments, in the process step b) the composition comprises the vehicle at a proportion in a range from 20 to 80 wt.-%, such as from 30 to 70 wt.-% or from 40 to 60 wt.-%, in each case based on the weight of the composition in the process step b).

In some embodiments, the vehicle is a suspending agent. An exemplary suspending agent is a liquid. An exemplary liquid suspending agent comprises, or is, a solvent. An exemplary solvent is organic or inorganic or both. An exemplary inorganic solvent is water. An exemplary organic solvent is selected from the group consisting of an alcohol, an ether, and an acetate, or a combination of at least two thereof. An exemplary alcohol is n-butanol or terpineol or both. An exemplary ether is di-ethyleneglycolemonoethylether or tri-propyleneglycolmonomethylether or both. An exemplary acetate is n-butylacetate. A further exemplary solvent is characterized by a vapour pressure of less than 10 bar, such as less than 5 bar or less than 1 bar.

In some embodiments, at least in the at least one surface region, such as across the full exterior surface or across the full wall surface, the wall surface is a surface of the layer of glass.

In some embodiments, the plurality of particles is characterized by particle size distribution having a $D_{50}$ in a range from 0.1 to 50 µm, such as from 0.1 to 40 µm, from 0.1 to 30 µm, from 0.1 to 20 µm, from 0.1 to 10 µm, from 0.1 to 5 µm, from 0.1 to 3 µm, or from 0.1 to 1 µm. In some embodiments, the plurality of particles is characterized by particle size distribution having a $D_{50}$ in a range from 0.5 to 40 µm, such as from 0.5 to 30 µm, from 0.5 to 20 µm, or from 1 to 10 µm.

In some embodiments, the particles of the plurality of particles are characterized by an aspect ratio in a range from 0.3 to 10, such as from 0.3 to 5 or from 0.3 to 2.

In some embodiments, the item is the previously described hollow body.

In some embodiments, in the process step b) the composition comprises the plurality of particles at a proportion in a range from 20 to 80 wt.-%, such as from 30 to 70 wt.-% or from 40 to 60 wt.-%, in each case based on the weight of the composition in the process step b).

In some embodiments, in the process step b) the composition further comprises a viscosity adjusting agent. The viscosity adjusting agent may be characterized by an average molecular weight which is more than an average molecular weight of the vehicle. An exemplary viscosity adjusting agent is organic or inorganic or both. An exemplary organic viscosity adjusting agent is a polymer or non-polymeric. An exemplary polymeric viscosity adjusting agent is selected from the group consisting of a polysaccharide, a block-co-polymer, a polyacrylate, and a resin, or a combination of at least two thereof. An exemplary polysaccharide is xanthan or cellulose or both. An exemplary cellulose is hydroxyethyl-cellulose or hydroxypropyl-cellulose or both. An exemplary resin is a natural resin. An exemplary natural resin is obtainable from a woody plant, such as a tree. An exemplary block-co-polymer is a tri-block-co-polymer. An exemplary polyacrylate is a polyacrylic acid, a polyalkylacrylate and a polyalkylmethacrylate or a combination of two or more therefrom. An exemplary non-polymeric viscosity adjusting agent is an alcohol. An exemplary alcohol is a di-alcohol or a polyalcohol or both. An exemplary di-alcohol is a glycol. An exemplary polyalcohol is a polyvinylalcohol or a polyethylenealcohol or both.

In some embodiments, the process step b) or c) or both comprises adjusting a contact angle of the wall surface for wetting with water in the at least one surface region to a value in a range from 0 to 45°, such as from 5 to 45° or 10 to 45°.

In some embodiments, prior to the process step b) the process comprises a step of at least partially decreasing a contact angle for wetting with water of the wall surface by a surface-treatment. The contact angle for wetting with water may be decreased across the full interior surface or exterior surface or both. In some embodiments, the contact angle for wetting with water is decreased across the full wall surface by the surface-treatment. Further, the contact angle for wetting with water of the wall surface may be at least partially decreased to less than 30°, such as less than 20° or less than 10°.

In some embodiments, the surface-treatment is selected from the group consisting of a plasma treatment, a flame treatment, a corona treatment, and a wet chemical treatment; or a combination of at least two thereof. An exemplary plasma treatment comprises contacting the wall surface with a plasma obtained from an O-comprising plasma precursor, or from a corona discharge, or both. An exemplary plasma precursor is a gas.

In some embodiments, the contacting in the process step b) comprises a printing. An exemplary printing is a contact printing or a contact-less printing or both. An exemplary contact printing is a screen printing. An exemplary contact-less printing is an inkjet printing. An exemplary composition is a screen printing paste.

In some embodiments, the process further comprises a process step d) of heating the wall surface at least partially to at least 200° C., such as at least 250° C., at least 300° C., or at least 320° C. The preceding temperature may be kept constant for a duration of at least 3 min, such as at least 5 min, at least 10 min, at least 30 min, or at least 1 h. The preceding duration may be up to several days, 48 h, or 24 h. In some embodiments, the interior surface or the exterior surface or both, such as the full wall surface, is heated in the process step d) as outlined in the preceding. The heating in the process step d) may be a measure of a depyrogenation step.

In some embodiments, the interior volume is in a range from 0.5 to 100 ml, such as from 1 to 100 ml, from 1 to 50 ml, from 1 to 10 ml, or from 2 to 10 ml.

In some embodiments, the hollow body is a container.

In some embodiments, the container is a packaging container for a medical or a pharmaceutical packaging good or both. The container may be a primary packaging container for a medical or a pharmaceutical packaging good or both. An exemplary pharmaceutical packaging good is a pharmaceutical composition. In some embodiments, the container is suitable for packaging parenterals in accordance with section 3.2.1 of the European Pharmacopoeia, 7th edition from 2011.

In some embodiments, the container is one selected from the group consisting of a vial, a syringe, a cartridge, and an ampoule; or a combination of at least two thereof.

In some embodiments, the at least one elevated region has a thickness in a range from 0.1 to 10 µm, such as from 0.5 to 8 µm, from 1 to 7 µm, from 2 to 6 µm, or from 3 to 5 µm, above the wall surface in the at least one surface region.

In some embodiments, the wall surface comprises a first surface region and a further surface region, wherein the first surface region and the further surface region are spatially distanced by at least 10%, such as at least 20%, at least 30%, at least 40%, or at least 50% of the height of the hollow body, the first surface region and the further surface region being at least partially positioned in the at least one contact region, the process step b) comprising contacting the wall surface across the first surface region and across the further surface region with the composition, the process step c) comprising forming at least one first elevated region from the composition in the first surface region and joining the at least one first elevated region to the wall surface in the first surface region, and forming at least one further elevated region from the composition in the further surface region and joining the at least one further elevated region to the wall surface in the further surface region. In some embodiments, the first surface region or the further surface region or both is fully positioned in the at least one contact region. Therein, the first and the further surface regions may be at least partially positioned in the same or different contact regions. In some embodiments, the wall surface comprises a first contact region, which extends along a first contact range of a height of the hollow body, and a further contact region, which extends along a further contact range of the height of the hollow body, wherein throughout the first contact range and throughout the further contact range an exterior diameter of the hollow body has a maximum, the first surface region being at least partially positioned in the first contact region, the further surface region being at least partially positioned in the further contact region. Therein, exterior diameter can have a first maximum in the first contact range and a further maximum in the further contact range, or the same maximum can extend throughout the first and the further contact range. In some embodiments, the first surface region is fully positioned in the first contact region, or the further surface region is fully positioned in the further contact region, or both. The first surface region and the further surface region may be spatially distanced by at least 10%, such as at least 20%, at least 30%, at least 40%, or at least 50% of the height of the hollow body in a direction of the height of the hollow body. In some embodiments, the first surface region, or the further surface region, or both each extends along at least 50%, such as along at least 60%, along at least 70%, along at least 80%, along at least 90%, along at least 95%, or along a full length, of a circumference of the hollow body. In the case in which the first surface region, or the further surface region, or both each extends along the full length of the circumference of the hollow body, the corresponding surface region or both surface regions may each form a closed loop. In some embodiments, the first surface region, or the further surface region or both each extends cylindrically symmetric around the interior volume of the hollow body. In some embodiments, the first surface region, or the further surface region, or both each is a ring-shaped circumferential region. In some embodiments, a single first elevated region is formed and joined to the wall surface in the process step c) in the first surface region, this single first elevated region covering the wall surface in the first surface region fully. Additionally or alternatively, a single further elevated region is formed and joined to the wall surface in the process step c) in the further surface region, this single further elevated region covering the wall surface in the further surface region fully. In some embodiments, the hollow body comprises exactly the preceding first and further surface regions, and no other surface region of the wall surface, in which the wall surface is contacted with the composition in the process step b).

In some embodiments, the wall surface comprises an interior surface which faces the interior volume, and an exterior surface which faces away from the interior volume. The exterior surface comprises the at least one surface region. In some embodiments, in the process step b) the wall surface is not contacted with the composition in any part region of the interior surface. Hence, in some embodiments no elevated region is formed on the interior surface and joined to the interior surface in the process step c). The interior surface may be a surface of the layer of glass. Additionally or alternatively, the exterior surface is a surface of the layer of glass. In some embodiments, the wall surface consists of the interior surface and the exterior surface.

In some embodiments, the at least one surface region forms at least 50%, such as at least 60%, at least 70%, at least 80%, or at least 90%, of a surface area of the exterior surface.

In some embodiments, the at least one surface region has a width which extends along the height of the hollow body and which is in a range from 1 to 80%, such as from 1 to 70%, from 1 to 60%, from 1 to 50%, from 1 to 40%, from 1 to 30%, or from 1 to 20%, in each case of the height of the hollow body.

In some embodiments, in the process step c) a plurality of elevated regions is formed from the composition and the elevated regions of the plurality of elevated regions are joined to the wall surface in the at least one surface region. In some embodiments, the elevated regions of the plurality of elevated regions form a pattern of mutually spaced regions, such as bumps or dots, on the wall surface in the at least one surface region. Therein, the pattern may be regular or irregular. In case of a first and a further surface region, in the process step c) a first plurality of elevated regions may be formed from the composition and the elevated regions of the first plurality of elevated regions are joined to the wall surface in the first surface region, and a further plurality of elevated regions is formed from the composition and the elevated regions of the further plurality of elevated regions are joined to the wall surface in the further surface region.

In some embodiments, after the process step c) the elevated regions of the plurality of elevated regions are arranged on the wall surface in a mutually spaced manner.

In some embodiments, after the process step c) in the at least one surface region each elevated region of the plurality of elevated regions is arranged on the wall surface with a distance to the closest elevated region of the plurality of elevated regions in a range from 0.5 µm to 1 mm, such as from 1 to 500 µm.

In some embodiments, the elevated regions of the plurality of elevated regions have a diameter in a range from 5 to 2500 µm, such as from 5 to 2000 µm, from 5 to 1500 µm, from 5 to 1000 µm, from 50 to 800, or from 50 to 500 µm.

In some embodiments, the plurality of elevated regions covers 5 to 90%, such as 20 to 80%, 30 to 70%, or 40 to 60%, of the wall surface in the at least one surface region. Hence, here the plurality of elevated regions superimposes the wall surface in the at least one surface region at a cover ratio in the preceding range.

In some embodiments, the at least one elevated region fully covers the wall surface in the at least one surface region. In some embodiments, a single elevated region covers the wall surface in the at least one surface region fully. For example, the at least one elevated region may extend along at least 50%, such as along at least 60%, along at least 70%, along at least 80%, along at least 90%, along at least 95%, or along a full length, of a circumference of the hollow body. In the case in which the at least one elevated region extends along the full length of the circumference of the hollow body, the at least one elevated region may form a closed loop. In some embodiments, the at least one elevated region extends cylindrically symmetric around the interior volume of the hollow body. In some embodiments, the at least one elevated region is a ring-shaped circumferential region. In case of multiple surface regions, each surface region may comprise a single elevated region which covers the wall surface in the corresponding surface region fully.

In some embodiments, the wall comprises from top to bottom of the hollow body a top region; a body region, which follows the top region via a shoulder; and a bottom region, which follows the body region via a heel.

In some embodiments, the body region is a lateral region of the hollow body. The body region of the wall may form a hollow cylinder. The top region may comprise, or consist of, from top to bottom of the hollow body a flange and a neck.

In some embodiments, one selected from the group consisting of the body region, the shoulder, and the heel, or a combination of at least two thereof comprises the at least one surface region. In case the wall surface comprises a first and a further surface region, in some embodiments the shoulder comprises the first surface region at least partially, such as fully, and the heel may comprise the further surface region at least partially, such as fully. In a case in which the at least one surface region is comprised by two or more of the preceding regions of the wall, each of these regions may comprise at least one coherent surface region. In some embodiments, the top region comprises no region of the wall surface which is contacted with the composition in the process step b).

In some embodiments, throughout the body region a thickness of the layer of glass is in a range from ±0.3 mm, such as ±0.2 mm, ±0.1 mm, or ±0.08 mm, in each case based on a mean value of this thickness in the body region of the wall.

In some embodiments, throughout the body region a thickness of the layer of glass is in a range from 0.5 to 2 mm, such as from 0.6 to 1.7 mm or from 0.9 to 1.6 mm. In some embodiments, throughout the body region a thickness of the layer of glass is in a range from 0.9 to 1.1 mm or from 1.5 to 1.7 mm.

In some embodiments, towards the interior volume the layer of glass is at least partially superimposed by an alkali metal barrier layer or by a hydrophobic layer or both.

In some exemplary embodiments disclosed herein, a hollow body obtainable by the previously described process is provided. In some embodiments of the hollow body, it shows the technical features of the previously described hollow body.

In some exemplary embodiments disclosed herein, a closed hollow body is provided that includes a wall which at least partially surrounds an interior volume which comprises a pharmaceutical composition; the wall comprises a layer of glass, comprising a first glass composition, comprises a base surface, and has a wall surface; the wall surface comprises at least one surface region, in which the base surface is at least partially superimposed by at least one elevated region, and at least one contact region, which extends along a contact range of a height of the hollow body; the at least one elevated region comprises a further glass composition; throughout the contact range an exterior diameter of the hollow body has a maximum; the at least one surface region is at least partially positioned in the at least one contact region. In some embodiments of the closed hollow body, it shows the technical features of the previously described hollow body.

In some exemplary embodiments disclosed herein, a process is provided that comprises as process steps:

A) providing the previously described hollow body;
B) inserting a pharmaceutical composition into the interior volume; and
C) closing the hollow body.

The closing in the process step C) may comprise contacting the hollow body with a closure, such as a lid, covering an opening of the hollow body with the closure, and joining the closure to the hollow body. The joining may comprise creating a form-fit of the hollow body, such as of the flange of the hollow body, with the closure. The form-fit may be created via a crimping step. The process may be a process for packaging the pharmaceutical composition. In some embodiments, prior to the process step B) the process comprises a step of heating the wall surface at least partially to at least 200° C., such as at least 250° C., at least 300° C., or at least 320° C. The preceding temperature may be kept constant for a duration of at least 3 min, such as at least 5 min, at least 10 min, at least 30 min, or at least 1 h. The preceding duration may be up to several days, 48 h, or 24 h. In some embodiments, the interior surface or the exterior surface or both, such as the full wall surface, is heated as outlined in the preceding. In some embodiments, the heating is a measure of a depyrogenation step.

In some exemplary embodiments disclosed herein, a closed hollow body obtainable by the previously described process is provided.

In some exemplary embodiments disclosed herein, a process is provided that comprises as process steps:
A. providing the previously described hollow body or the closed hollow body; and
B. administering the pharmaceutical composition to a patient.

In some exemplary embodiments disclosed herein, a use of the previously described hollow body is provided for packaging a pharmaceutical composition. The packaging may comprise inserting the pharmaceutical composition into the interior volume and closing the hollow body.

In some exemplary embodiments disclosed herein, a use of a plurality of glass particles is provided for functionalizing at least one surface region of an exterior surface of a wall of a glass container for packaging a pharmaceutical composition. The functionalizing comprises:
A} contacting the exterior surface across the at least one surface region with the plurality of glass particles, and
B} forming at least one elevated region at least in part from the plurality of glass particles and joining the at least one elevated region to the exterior surface in the at least one surface region, the exterior surface comprising at least one contact region, which extends along a contact range of a height of the glass container, throughout the contact range an exterior diameter of the glass container has a maximum, the at least one surface region is at least partially positioned in the at least one contact region. In some embodiments, the glass particles are designed as the plurality of particles of the previously described process. In some embodiments, the exterior surface is a surface of a layer of glass as described herein in the context of the previously described hollow body. In some embodiments, the least one elevated region is designed as described herein in the context of the previously described hollow body. In some embodiments, the glass container is designed as the previously described hollow body in the context of the previously described process. In some embodiments, a step selected from the group consisting of the contacting, the forming, and the joining, or a combination of at least two thereof is designed as described herein in the context of the previously described process.

In some embodiments, the wall of the glass container comprises a first glass composition, the glass particles of the plurality of glass particles comprise a further glass composition, and the first glass composition is different from the further glass composition. The first and the further glass compositions may be designed according to any embodiment of the previously described hollow body.

In some embodiments, the functionalizing comprises adjusting a contact angle of the exterior surface for wetting with water in the at one least surface region to a value in a range from 0 to 45°, such as from 5 to 45° or 10 to 45°.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Hollow Body

Figure 1:
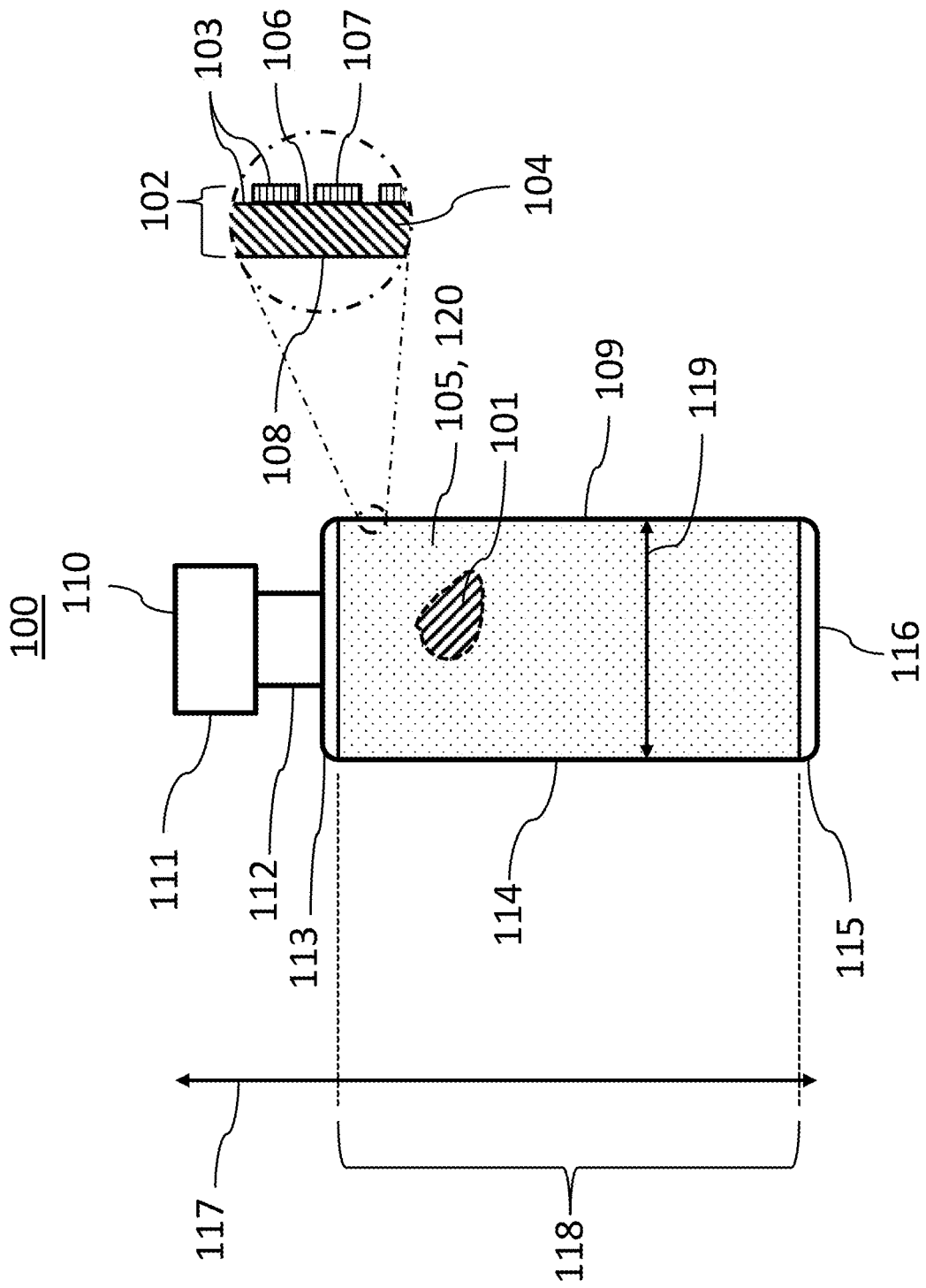
FIG. 1 illustrates a schematic depiction of an exemplary embodiment a hollow body provided according to the invention.

The hollow body provided according to the invention may have any size or shape which the skilled person deems appropriate in the context of the invention. In some embodiments, the head region of the hollow body comprises an opening, which allows for inserting a pharmaceutical composition into the interior volume of the hollow body. In that case, the wall surrounds the interior volume of the hollow body only partially. The hollow body may be a glass body or a glass container in that sense that the layer of glass extends over the full area of the wall surface. In that case, the layer of glass may determine a macroscopic shape of the wall. In some embodiments, the layer of glass is of a one-piece design. The layer of glass of such a glass body or a glass container may be made by blow molding a glass melt; or by preparing a tube of a glass, such as in form of a hollow cylinder, forming the bottom of the hollow body from one end of the tube, thereby closing the tube at this end, and forming the head region of the hollow body from the opposite end of the tube. According to the nomenclature used herein, the wall of the hollow body comprises the layer of glass and every layer and every functionalization superimposed thereon. The wall surface is formed by the surface of the layer or functionalization, such as elevated regions, which is positioned at an outermost or innermost position of the wall.

As used herein, the interior volume represents the full volume of the interior of the hollow body. This volume may be determined by filling the interior of the hollow body with water up to the brim and measuring the volume of the amount of water which the interior can take up to the brim. Hence, the interior volume as used herein is not a nominal volume as it is often referred to in the technical field of pharmacy. This nominal volume may, for example, be less than the interior volume by a factor of about 0.5.

As used herein, the exterior diameter of the hollow body at a position along the height of the hollow body is determined in a cross sectional plane through the height of the hollow body at this position, the cross-sectional plane being perpendicular to the height of the hollow body.

Contact Region

In some embodiments, the at least one contact region, i.e., each contact region, is a region of the exterior surface of the hollow body at which the hollow body contacts a further hollow body, the further hollow body being identical to the hollow body, both hollow bodies standing upright on a plane surface, a distance between both hollow bodies having been reduced until both hollow bodies have been brought into contact, the hollow body being positioned at a certain angle of rotation around an axis along the height of the hollow body with respect to the further hollow body. In some embodiments, the contact region is a cylindrically symmetric region of the exterior surface and thus, the preceding definition may be independent from the angle of rotation of the hollow body with respect to the further hollow body. In some embodiments, the at least one contact region extends along at least 50%, such as along at least 60%, along at least 70%, along at least 80%, along at least 90%, along at least 95%, or along a full length, of a circumference of the hollow body. In the case in which the at least one contact region extends along the full length of the circumference of the hollow body, the at least one contact region may form a closed loop. In some embodiments, the at least one contact region extends cylindrically symmetric around the interior volume of the hollow body. In some embodiments, the at least one contact region is a ring-shaped circumferential region. An exemplary maximum is a local maximum, or a global maximum, or both. Therein, a global maximum means that the hollow body does not have a larger exterior diameter in any cross-sectional plane which is perpendicular to the height of the hollow body and which is at a height which is not in the contact range. A local maximum means that the hollow body may have a larger exterior diameter in a cross-sectional plane which is perpendicular to the height of the hollow body and which is at a height which is not in the at least one contact range, but in any cross sectional plane which is perpendicular to the height of the hollow body and which is at a height which limits the at least one contact range the exterior diameter of the hollow body is smaller than in the at least one contact range.

Base Surface and Elevated Regions

For the use herein, the base surface defines a ground level on which the at least one elevated region is positioned. The base surface may be a lateral surface of a geometric body, such as of a cylinder. Further, the base surface may be a smooth curved surface on which the elevated regions form bumps or embossments. The base surface may be a surface of the layer of glass.

Elevated Regions

The elevated regions can have any size or shape which the skilled person deems appropriate in the context of the invention. In a top view onto the at least one surface region, the at least one elevated region may be of a circular or elliptic shape. In case of a plurality of elevated regions, those may be of microscopic or macroscopic size and the elevated regions may form a pattern on the base surface. In case of a single elevated region per surface region, this elevated region may be of macroscopic size.

In some embodiments, the at least one elevated region consists of the further glass composition. In some embodiments, the at least one elevated region further comprises at least one colorant, or at least one filler, or both. An exemplary colorant is a pigment, or a dye, or both. An exemplary filler, being used in the composition of the at least one elevated region, acts to modify a coefficient of thermal expansion (CTE) of the at least one elevated region to be closer to a coefficient of thermal expansion of the layer of glass, the filler may act to modify the coefficient of thermal expansion (CTE) of the at least one elevated region to be approximately equal to the coefficient of thermal expansion of the layer of glass. Hence, the filler may help to reduce mechanical stresses between the at least one elevated region and the layer of glass by bringing their coefficients of thermal expansion closer together. In some embodiments, the at least one elevated region comprises no colorant, such as the at least one elevated region is transparent for visible light. In some embodiments, the first glass composition and the further glass composition are identical.

In some embodiments, the wall surface comprises a single surface region which represents at least 50%, such as at least 60%, at least 70%, or at least 80%, of a surface area of the exterior surface of the wall, throughout this surface region a plurality of elevated regions is superimposed on the base surface, and may form a pattern on the base surface. In some embodiments, the wall surface comprises at least two surface regions which each form a ring which extends circumferentially around the interior volume of the hollow body. In some embodiments, each of those rings comprises a single elevated region which convers the base surface in the respective ring fully. In some embodiments, each of those rings comprises a plurality of elevated regions which superimposes the base surface across the respective ring, each of those pluralities of elevated regions may form a pattern on the base surface across the respective ring. In some embodiments, one ring comprises a single elevated region which covers the base surface in the ring fully, and a further ring comprises a plurality of elevated regions which superimpose the base surface across the respective ring, and may form a pattern on the base surface across the respective ring.

Surface Region

In some embodiments, each surface region is a coherent region. In other words, in some embodiments none of the at least one surface regions is a discontinuous region. Herein, a discontinuous region is a region which comprises multiple mutually spaced regions.

First Glass Composition

The first glass composition of the layer of glass may be any type of glass and may consist of any material or combination of materials which the skilled person deems suitable in the context of the invention. In some embodiments, the first glass composition is suitable for pharmaceutical packaging. In some embodiments, the first glass composition is a glass of type I in accordance with the definitions of glass types in section 3.2.1 of the European Pharmacopoeia, 7th edition from 2011. Any references to a type I glass herein refer to the preceding definition. Additionally or alternatively to the preceding, the first glass composition is selected from the group consisting of a borosilicate glass, an aluminosilicate glass, and fused silica; or a combination of at least two thereof. As used herein, an aluminosilicate glass is a glass which has a content of $Al_2O_3$ of more than 8 wt.-%, such as more than 9 wt.-% or in a range from 9 to 20 wt.-%, in each case based on the total weight of the glass. An exemplary aluminosilicate glass has a content of $B_2O_3$ of less than 8 wt.-%, such as at maximum 7 wt.-%, or in a range from 0 to 7 wt.-%, in each case based on the total weight of the glass. As used herein, a borosilicate glass is a glass which has a content of $B_2O_3$ of at least 1 wt.-%, such as at least 2 wt.-%, at least 3 wt.-%, at least 4 wt.-%, at least 5 wt.-%, or in a range from 5 to 15 wt.-%, in each case based on the total weight of the glass. An exemplary borosilicate glass has a content of $Al_2O_3$ of less than 7.5 wt.-%, such as less than 6.5 wt.-%, or in a range from 0 to 5.5 wt.-%, in each case based on the total weight of the glass. In some embodiments, the borosilicate glass has a content of $Al_2O_3$ in a range from 3 to 7.5 wt.-%, such as in a range from 4 to 6 wt.-%, in each case based on the total weight of the glass.

A glass which may also be used as the first glass composition according to the invention is essentially free from B (boron). Therein, the wording "essentially free from B" refers to glasses which are free from B which has been added to the glass composition by purpose. This means that B may still be present as an impurity, but may be at a proportion of not more than 0.1 wt.-%, such as not more than 0.05 wt.-%, in each case based on the weight of the glass.

Vehicle

As the vehicle each vehicle which the skilled person knows and deems appropriate for being used in the context of the invention comes into consideration. Here, the vehicle is a, for example liquid, medium which allows for the at least partially application of the plurality of particles onto the wall surface in a convenient, uniform, manner. In some embodiments, the vehicle has a viscosity which is suitable for the preceding purpose. In some embodiments, the vehicle has a rather high vapour pressure which allows for decreasing the proportion of the vehicle in the composition through evaporation of the vehicle in the process step c). In some embodiments, in the process step c) the vehicle is evaporated completely. In a case in which the composition is a dispersion, the vehicle may be the continuous, for example liquid, phase of the dispersion. An exemplary vehicle is a screen printing oil. Suitable exemplary screen printing oils are commercially available under the tradenames H 948 Diluente 21 from Pemco, 650-63 IR-Medium Oil-based from Johnson Matthey, 80 3057-ME Siebdrucköl 670-315 (DSLA 80 3057-IME Screenprint DRM) from Ferro, and 80 3062-MS Siebdrucköl 670-687 from Ferro.

In some embodiments, in the process step b) of the process provided according to the invention, the composition is a dispersion. An exemplary dispersion is a suspension, or a colloid, or both. The composition of the process provided according to the invention may be a dispersion. Generally, a dispersion is a system in which particles are dispersed in a continuous phase. There are three main types of dispersions: a coarse dispersion which is also referred to as suspension, a colloid, and a solution. A suspension is a heterogeneous mixture that contains solid particles sufficiently large for sedimentation. A suspension is a heterogeneous mixture in which the dispersed particles do not dissolve, but get suspended throughout the bulk of the continuous phase, left floating around freely in the medium. The particles may be dispersed throughout the continuous phase through mechanical agitation, with the use of certain excipients or suspending or dispersing agents. The suspended particles are visible under a microscope and will settle over time if left undisturbed. This distinguishes a suspension from a colloid, in which the dispersed particles are smaller and do not settle. Colloids and suspensions are different from a solution, in which the particles do not exist as a solid, but are dissolved. The composition of the invention may be a dispersion in which the particles of the plurality of particles are dispersed in a liquid phase, referred to herein as vehicle. In the context of the composition of the invention, an exemplary dispersion is a suspension or a colloid or both.

Filler

A filler may be a plurality of filler particles, the filler particles having a melting temperature which is above the further softening temperature of the further glass composition, such as by at least 10° C., by at least 20° C., or by at least 50° C. An exemplary filler, being used in the composition, acts to modify a coefficient of thermal expansion (CTE) of the at least one elevated region to be closer to a coefficient of thermal expansion of the layer of glass, such as the filler acts to modify the coefficient of thermal expansion (CTE) of the at least one elevated region to be approximately equal to the coefficient of thermal expansion of the layer of glass. Hence, the exemplary filler helps to reduce mechanical stresses between the at least one elevated region and the layer of glass by bringing their coefficients of thermal expansion closer together.

Depyrogenation

In some embodiments, the heating in the process step d) of the process or the heating prior the process step B) of the process or both is a measure of a depyrogenation step. In the technical field of pharmacy, depyrogenation is a step of decreasing an amount of pyrogenic germs on a surface, such as via a heat-treatment. Therein, the amount of pyrogenic germs on the surface may be decreased as much as possible, such as by at least 80%, at least 90%, at least 95%, at least 99%, at least 99.5%, or by 100%, in each case based on an amount of the pyrogenic germs on the surface prior to the depyrogenation.

Pharmaceutical Composition

In the context of the invention, every pharmaceutical composition which the skilled person deems suitable comes into consideration. A pharmaceutical composition is a composition comprising at least one active ingredient. An exemplary active ingredient is a vaccine. The pharmaceutical composition may be liquid or solid or both. An exemplary solid composition is granular such as a powder, a multitude of tablets or a multitude of capsules. An exemplary pharmaceutical composition is a parenteral, i.e. a composition which is intended to be administered via the parenteral route, which may be any route which is not enteral. Parenteral administration can be performed by injection, e.g. using a needle (usually a hypodermic needle) and a syringe, or by the insertion of an indwelling catheter.

Wall

Herein, the wall of the hollow body comprises a layer of glass. The wall may comprise further layers on one or both sides of the layer of glass. The layer of glass may extend laterally throughout the wall. This means that, in some embodiments, each point on the wall surface lies on top of a point of the layer of glass. The hollow body may be a hollow body of glass. In any case, the layers of the wall are joined to one another. Two layers are joined to one another when their adhesion to one another goes beyond Van-der-Waals attraction forces.

Unless otherwise indicated, the components of the wall, in particular layers and elevated regions, may follow one another in a direction of a thickness of the wall indirectly, in other words with one or at least two intermediate components, or directly, in other words without any intermediate component. This is particularly the case with the formulation wherein one component, for example an elevated region, superimposes another, for example the layer of glass. Further, if a component is superimposed onto a layer or a surface, this component may be contacted with that layer or surface or it may not be contacted with that layer or surface, but be indirectly overlaid onto that layer or surface with another component (e.g. a layer) in-between.

Alkali Metal Barrier Layer and Hydrophobic Layer

In some embodiments, the layer of glass of the hollow body is superimposed by an alkali metal barrier layer or by a hydrophobic layer or both, in each case towards the interior volume of the hollow body. In some embodiments, the alkali metal barrier layer or by the hydrophobic layer or both form at least a part of the interior surface, such as the full interior surface. The alkali metal barrier layer may consist of any material or any combination of materials which the skilled person deems suitable for providing a barrier action against migration of an alkali metal ion, such as against any alkali metal ion. The alkali metal barrier layer may be of a multilayer structure. In some embodiments, the alkali metal barrier layer comprises $SiO_2$, such as a layer of $SiO_2$. Further, the hydrophobic layer may consist of any material or any combination of materials which provides a layer surface towards the interior volume which has a contact angle for wetting with water of more than 90°. The hydrophobic layer may allow for the formation of a well-defined cake upon freeze-drying, in particular in terms of a shape of the cake. An exemplary hydrophobic layer comprises a compound of the general formula $SiO_xC_yH_z$, such as a layer of this compound. Therein, x is a number which is less than 1, such as in a range from 0.6 to 0.9 or from 0.7 to 0.8; y is a number in a range from 1.2 to 3.3, such as from 1.5 to 2.5; and z is a number as well.

Measurement Methods

The following measurement methods are to be used in the context of the invention. Unless otherwise specified, the measurements have to be carried out at an ambient temperature of 23° C., an ambient air pressure of 100 kPa (0.986 atm) and a relative atmospheric humidity of 50%.

Contact Angle for Wetting with Water

The contact angle of a surface for wetting with water is determined in accordance with the standard DIN 55660, parts 1 and 2. The contact angle is determined using the static method. Deviating from the standard, the measurement is conducted at curved surfaces as the wall of the hollow body is usually curved. Further, the measurements are conducted at 22 to 25° C. ambient temperature and 20 to 35% relative atmospheric humidity. A Drop Shape Analyzer—DSA30S from Krüss GmbH is applied for the measurements. Uncertainty of the measurement increases for contact angles below 10°.

Wall Thickness and Tolerance of Wall Thickness

The wall thickness and deviations from the mean value of the wall thickness (tolerance) are determined in accordance with the following standards for the respective type of hollow body:

DIN ISO 8362-1 for vials,
DIN ISO 9187-1 for ampoules,
DIN ISO 110 4 0-4 for syringes,
DIN ISO 13926-1 for cylindrical cartridges, and
DIN ISO 11040-1 for dental cartridges.

Scratch Test

An MCT MikroCombiTester (MCT S/N 01-04488) from CSM Instruments is applied for the scratch test. As the scratch partner, a hollow body which is identical to the hollow body to be tested, including any coatings or functionalization, is used. Further, in the test same surfaces are scratched against each other. The scratch partner is hold in position by a special mount above the hollow body to be tested. Here, the scratch partner and the hollow body to be tested incline an angle of 90° in a top view. For both measurements, the hollow body to be tested is moved forwards, thereby scratching over the surface of the scratch partner at a well-defined test force (normal force). For the test, the hollow body to be tested is moved forwards underneath the scratch partner at a velocity of 10 mm/min over a test length of 15 mm. The test force is progressively increased from 0 to 30 N (load rate 19.99 N/min) across the test length. Afterwards, the scratched surface is checked with a microscope at a magnification of 5 times.

Coefficient of Linear Thermal Expansion

Unless otherwise specified, the coefficients of linear thermal expansion mentioned herein refer to the temperature range from 20 to 300° C. The coefficient of linear thermal expansion is determined using a dilatometer. The dilatometer is used in accordance with the best practice which the skilled person knows and which is suitable here. In case of a glass sample which is not suitable for determining its coefficient of linear thermal expansion directly, the composition of the glass sample is determined using energy dispersive X-ray spectroscopy. Then a sample which is suitable for determining its coefficient of linear thermal expansion with the same composition is prepared and the coefficient of linear thermal expansion is determined for this sample.

Softening Temperature

The softening temperature of a glass is defined as the temperature of the glass at which the glass has a viscosity η in dPa·s (=Poise) such that $\log_{10}(\eta)=7.6$. The softening temperature is determined in accordance with ISO 7884-3.

Transformation Temperature $T_g$

The transformation temperature is determined in accordance with ISO 7884-8.

Thickness of Elevated Regions

A cross-sectional cut through the elevated regions to be studied is prepared in accordance with the best suitable practice which is known to the skilled person. Then, the thickness of the elevated regions is measured using either a scanning electron microscope or a white-light-microscope, whichever is suitable for the size of the elevated regions to the studied. 5 single thicknesses are measured, in case of a plurality of elevated regions each on another elevated region, and the arithmetic mean of the 5 values is calculated.

Diameter of Elevated Regions

The diameter of an elevated region of a plurality of elevated regions is determined by measuring the length of the longest straight line which lies completely in the elevated region, which is perpendicular to the thickness of the elevated region, and which connects two points on the rim of the elevated region. If appropriate, depending on the size of the elevated regions to be studied, the measurement is conducted using a scanning electron microscope or a white-light-microscope.

Cover Ratio

Here, a topographical measurement of the surface to be studied is conducted with a white-light-spectrometer of the type Coherence Scanning Interferometry/Phase Shift Interferometry (CSI/PSI) from Zygo Corporation. The cover ratio is calculated from the obtained topographical image. The sum of the elevated areas is divided by the total area of measurement.

Particle Size Distribution

The particle size distribution of the plurality of particles in the composition is determined by static light scattering. A particle size analyser named CILAS 920 from CILAS is applied for the measurement. For measurement the particles are dispersed in water. The concentration is defined by the obscuration value of the dispersion. A value of 14 to 16% has proven to be a good value for a reliable measurement. The dispersion is pumped continuously through a measuring cell where the laser beam can illuminate the particle ensemble. During the pumping in the measuring circuit, ultrasound is applied for 120 s to the system enabling destruction of agglomerates.

The aspect ratio of the particles is determined using an optical microscope or a scanning electron microscope. In each case, lengths and thicknesses of 10 arbitrarily chosen particles of the plurality of particles to be studied are measured and the arithmetic mean value is determined.

Particles

A cross-sectional cut through the elevated regions to be studied is prepared in accordance with the best suitable practice which is known to the skilled person. Then, the cut is inspected for the presence of particles, such as pigments and fillers, using a scanning electron microscope and a white-light-microscope.

Exemplary embodiments of the invention are set out in more detail below by examples and drawings, with the examples and drawings not denoting any restriction on the invention. Furthermore, unless otherwise indicated, the drawings are not to scale.

Example 1 (According to the Invention)

Preparation of the Composition:
Glass frits are prepared from a glass melt of the composition:
62 mol-% of $SiO_2$,
3.5 mol-% of $Al_2O_3$,
1.4 mol-% of $Bi_2O_3$,
23 mol-% of $B_2O_3$,
9.8 mol-% of $Li_2O$, and
0.3 mol-% of $Na_2O$.

The glass has a coefficient of linear thermal expansion for the temperature range from 20 to 300° C. of 4.8 ppm/K, a transformation temperature of 470° C., and a softening temperature of 860° C. The glass frits are ground until a particle size distribution with a $D_{50}$ in a range from 1 to 10 µm is obtained. Then, 45 g of the ground glass frits are mixed with 55 g of the solvent H948 Diluent 21 from Pemco in a dissolver of the type DISPERMAT from Getzmann. Subsequently, the glass frits in the obtained mixture are homogenised by feeding the mixture two times through a 3-roll-mill. The gaps between the rolls of the mill are adjusted to get successively narrower from each pair of rolls to the next. A suspension for functionalizing containers as set forth below is obtained.

Functionalization with the Composition:

A commercially available glass vial of the type "Vial 2.00 ml Fiolax clear" from Schott AG, which is further of the type 2R according to DIN/ISO 8362, is provided. The glass of the vial has a transformation temperature of 560° C. The surface of this vial does not have any coating or functionalization. The vial has a body region which is of the shape of a hollow cylinder. Hence, the vial has a global maximum of its exterior diameter throughout the body region. The vial is washed as described below. The suspension which is obtained as explained above is applied to the exterior surface of the vial by screen printing and lithography, thereby forming a regular pattern of a plurality of ellipses across the full exterior surface of the vial in its body region. The screen which is used for the screen printing has a mesh 120 T of polyester. The pattern consists of ellipses which have a length in the x-direction of 930 µm and in the y-direction of 1,100 µm. The distance between the ellipses in the x-direction is 740 µm and in the y-direction 930 µm. The thickness of the applied suspension is about 10 µm. The applied suspension is cured for 10 min at 600° C. in an oven.

Example 2 (According to the Invention)

Preparation of the Composition: The composition is prepared as provided above for the example 1.

Functionalization with the Composition:

A commercially available glass vial of the type "Vial 2.00 ml Fiolax clear" from Schott AG, which is further of the type 2R according to DIN/ISO 8362, is provided. The glass of the vial has a transformation temperature of 560° C. The surface of this vial does not have any coating or functionalization. This vial is washed as described below. The suspension which is obtained as explained above is applied to the exterior surface of the vial by screen printing and lithography, thereby forming two rings which extend circumferentially around the interior of the container (see FIG. 2) in the body region of the vial. This body region is of the shape of a hollow cylinder. Hence, the vial has a global maximum of its exterior diameter throughout the body region. Each ring has a width of 1 mm. The two rings are spaced by 1 cm in a direction of the height of the vial. The screen used for screen printing has the same characteristics as provided above for the example 1. Thus, a regular pattern of ellipses is formed across the full exterior surface of the vial within each ring. The thickness of the applied suspension is about 10 µm. Then the applied suspension is cured by heating in an oven. Therein, the temperature is increased within 10 min to 250° C. This temperature is kept constant for 1 min. Subsequently, the temperature is increased further within 1 h to 650° C. Again, the temperature is kept constant for 1 min. The subsequent cooling is conducted in accordance with the characteristic curve of the oven.

Example 3 (According to the Invention)

Preparation of the Composition:
The composition is prepared as provided above for the example 1.

Functionalization with the Composition:
A commercially available glass vial of the type "Vial 2.00 ml Fiolax clear" from Schott AG, which is further of the type 2R according to DIN/ISO 8362, is provided. The surface of this vial does not have any coating or functionalization. The vial has a body region which is of the shape of a hollow cylinder. Hence, the vial has a global maximum of its exterior diameter throughout the body region. The vial is washed as described below. The suspension which is obtained as explained above is applied to the exterior surface of the vial by screen printing and lithography, thereby forming two rings which extend circumferentially around the interior of the container (see FIG. 3) in its body region. Each ring has a width of 1 mm. The two rings are spaced by 1 cm in a direction of the height of the vial. The suspension forms a continuous layer which covers the full exterior surface of the vial in each of the rings and which has a thickness of 10 μm. Then the suspension is cured by heating it in an oven. Therein, the temperature is increased within 10 min to 250° C. This temperature is kept constant for 1 min. Subsequently, the temperature is increased further within 1 h to 650° C. Again, the temperature is kept constant for 1 min. The subsequent cooling is conducted in accordance with the characteristic curve of the oven.

Comparative Example 1 (not According to the Invention)

A commercially available glass vial of the type "Vial 2.00 ml Fiolax clear" from Schott AG, which of the type 2R according to DIN/ISO 8362, is provided as a reference. The surface of this vial does not have any coating or functionalization. Prior to any measurement, the vial is washed.

Comparative Example 2 (not According to the Invention)

A commercially available glass vial of the type "Vial 2.00 ml Fiolax clear" from Schott AG, which of the type 2R according to DIN/ISO 8362, is washed and then coated on its exterior surface throughout its body region with MED10-6670 from NuSiL.

Comparative Example 3 (not According to the Invention)

A commercially available glass vial of the type "Vial 2.00 ml Fiolax clear" from Schott AG, which is further of the type 2R according to DIN/ISO 8362, is provided. The surface of this vial does not have any coating or functionalization. This vial is washed as described below. Then the vial is placed inside a SCS Labcoater®, Model PDS 2010. Via a vacuum process, the vial is first functionalized with 3-methacryloxypropyltrimethoxysilane by evaporation without further heat treatment and then coated with Parylen C by evaporation at 100° C. The final coating has a film thickness of 250 nm.

Comparative Example 4 (not According to the Invention)

Preparation of the Composition:
99.8 ml of high purity water are provided in a beaker. 0.2 ml of Levasil CS50-34P (50% $SiO_2$, average particle size less than 100 nm) from Akzo Nobel N.V. are added to the beaker and the obtained composition is stirred for 30 s with a magnetic stirrer at ambient temperature of 20° C. Subsequently, 0.5 ml g of Tween20 from Sigma Aldrich are added. Then, the composition is stirred for another 10 min. The thus obtained composition is ready for use.

Functionalization with the Composition:
A commercially available glass vial of the type "Vial 2.00 ml Fiolax clear" from Schott AG, which is further of the type 2R according to DIN/ISO 8362, is provided. The surface of this vial does not have any coating or functionalization. The vial has a body region which is of the shape of a hollow cylinder. Hence, the vial has a global maximum of its exterior diameter throughout the body region. The vial is washed as described below. The washed vial is immersed with its bottom first into the composition, which has been prepared as set out above, at a velocity of 30 cm/min. Therein, the head region of the vial, including the vial opening, is not immersed into the composition in order to prevent contacting the interior surface of the vial with the composition. The vial is kept in the composition for 2 s. Afterwards, the vial is retracted from the composition at a velocity of 20 cm/min. Subsequently, the vial is kept as it is for 10 s at ambient temperature of 20° C. Then the vial is placed with its bottom onto an absorbent substrate such as a paper towel. Then the composition which has been applied to the vial is dried by keeping the vial for 30 min at a temperature of 600° C. in an oven.

Evaluation
For each of the examples 1 to 3 and the comparative examples 1 to 4, the contact angle for wetting with water is determined in the respective functionalized region on the exterior surface of the vial body in accordance with the above measurement method. The results are shown in Table 1.

TABLE 1

Characterization of the exterior surfaces of the glass vials of the examples and comparative examples by their contact angles for wetting with water, in each case prior to any post treatment

| Example | Contact angle for water [°] |
| --- | --- |
| Example 1 | <10 |
| Example 2 | <10 |
| Example 3 | <10 |
| Comparative example 1 | <10 |
| Comparative example 2 | 70 |
| Comparative example 3 | 93 |
| Comparative example 4 | <10 |

Further, 10,000 of the vials of each example and comparative example, respectively, are processed on a standard pharmaceutical filling line and thus, filled with an influenza vaccine. Table 2 below shows an evaluation of the vials regarding their tendency to be damaged or even break on the filling line. Here, ++ means that no or only very few vials are being damaged or broken, + means that few vials are being damaged or broken, − means that damages to vials and broken vials occur more often than for +, −− means that damages to vials and broken vials occur more often than for −.

TABLE 2

Comparison of the tendency of the glass vials to be damaged on the filling line for the examples and comparative examples

| Example | Low tendency to damages on filling line |
|---|---|
| Example 1 | ++ |
| Example 2 | ++ |
| Example 3 | + |
| Comparative example 1 | -- |
| Comparative example 2 | - |
| Comparative example 3 | - |
| Comparative example 4 | -- |

Further, vials which have been filled with a pharmaceutical composition and closed typically have to be inspected, in particular for pharmaceutically relevant particles. This is usually done by optical methods. Here, vials of the examples 2 and 3 turn out to be advantageous as the optical inspection can easily be conducted on the vials between the functionalized rings of the exterior surface of the vials. Between those rings, no functionalization which could disturb the inspection is present on the vial surface.

Figure 9A:
FIG. 9A illustrates a microscope image of the result of a scratch test performed on a vial of example 1.

For further studies, functionalized surfaces of vials according to the examples 1 to 3 and the comparative examples 1 to 4 have been subjected to a scratch test which is described in detail in the above measurement methods section. Typical results of these tests are shown in FIGS. 9A to 9E. Therein, FIG. 9A shows a functionalized vial surface according to example 1, FIG. 9B an unfunctionalized surface of a reference vial according to comparative example 1, FIG. 9C a functionalized vial surface according to comparative example 2, FIG. 9D a functionalized vial surface according to comparative example 3, and FIG. 9E a functionalized vial surface according to comparative example 2, in each case after having been subjected to the scratch test. It can be seen that the vial surface of example 1 has been protected from scratches by the functionalization better than the surfaces of the vials of the comparative examples. In the FIGS. 9A to 9E, the force with which the scratch partner is pushed against the vial surface is increased linearly from 0.1 N (at the left margins of the figures) up to 30 N (at the right margins of the figures). As the FIGS. 9A to 9E show typical results of the scratch test studies, it can be concluded that the protection of the vial surfaces from scratches has been improved for vials which have been functionalized according to the invention with respect to the unfunctionalized reference vial and also with respect to the vials which have been functionalized according to the comparative examples 2 to 4. Further, the emission of particles from the scratched surfaces is observed. During scratching glass particles or particles of the functionalization may detach from the vial surface. The detachment of particles is to be avoided as far as possible on a pharmaceutical filling line as such particles may contaminate the containers in a pharmaceutically relevant manner. Table 3 below summarizes the results of the scratch test studies regarding protection of the glass surface of the vials and the detachment of particles during scratching. Therein, ++ means a more favourable result than +, + means a more favourable result than -, and - means a more favourable result than --.

TABLE 3

Comparison of scratch test results regarding protection of the glass surface of the vial and avoidance of particle detachment from the vial or the functionalization upon scratching

| | Glass surface of vial protected from scratches | Avoidance of particle detachment |
|---|---|---|
| Example 1 | + | + |
| Example 2 | + | + |
| Example 3 | ++ | + |
| Comparative example 1 | -- | - |
| Comparative example 2 | - | - |
| Comparative example 3 | - | - |
| Comparative example 4 | -- | - |

Post-Treatment

For further studies, the vials of the examples 1 to 3 and of the comparative example 1 as reference are subjected to three different kinds of post-treatment, i.e. a washing procedure, a depyrogenation procedure and a freeze drying. These kinds of post-treatment are described below. The washing procedure is the same as used prior to functionalizing/coating the vials in the examples 1 to 3 and of the comparative examples 2 to 4. Also the reference vial of comparative example 1 has been washed as described below.

Washing:

A HAMO LS 2000 washing machine is applied for the washing procedure. The HAMO LS 2000 is connected to the purified water supply. Further, the following devices are used.

cage 1: 144 with 4 mm nozzles
cage 2: 252 with 4 mm nozzles
drying cabinet from Heraeus (adjustable up to 300° C.)

The tap is opened. Then the machine is started via the main switch. After conducting an internal check, the washing machine shows to be ready on the display. Program 47 is a standard cleaning-program which operates with the following parameters:

pre-washing without heating for 2 min
washing at 40° C. for 6 min
pre-rinsing without heating for 5 min
rinsing without heating for 10 min
end-rinsing at without heating for 10 min
drying without heating for 5 min The holder for the vials in the cages 1 and 2 have to be adjusted considering the size of the vials in order to obtain a distance of the nozzle of about 1.5 cm. The vials to be washed are placed on the nozzles with the head first. Subsequently, the stainless-steel mesh is fixed on the cage. The cage is oriented to the left and pushed into the machine. Then the machine is closed. Program 47 (GLAS040102) is selected and then the HAMO is started via START. After the program has finished (1 h), the cages are taken out and the vials are placed with their opening facing downwards in drying cages. A convection drying cabinet with ambient air filter is applied for the drying. The drying cabinet is adjusted to 300° C. The vials are placed into the drying cabinet for 20 min. After the vials have cooled down, they are sorted into appropriate boxes.

Depyrogenation:

The vials are depyrogenized by placing them in an oven which is heated to 350° C. This temperature is kept constant for 1 h. Subsequently, the vials are taken out of the oven and left to cool down.

Freeze Drying:

The vials are freeze dried by storing them for 4 hours at −70° C.

Evaluation after Post-Treatment

Vials of the examples 1 to 3 have been subjected to various combinations of the above types of post-treatment. It has been found that the functionalizations of examples 1 to 3 withstand the washing procedure as well as the depyrogenation procedure and the freeze drying. In particular, tests have been conducted, in that vials according to the examples 1 to 3 have been freeze dried. Prior to and after this procedure the functionalized surfaces have been checked for damages and defects under the microscope at a magnification of 5 to 20 times. It has been observed that no defects or damages have been caused by the freeze-drying procedure.

FIG. 1 shows a schematic depiction of a hollow body 100 according to the invention. The hollow body 100 comprises a wall 102 which partially surrounds an interior volume 101 of the hollow body 100. The wall 102 surrounds the interior volume 101 only partially in that the hollow body 100 comprises an opening 110 which allows for filling the hollow body 100 with a pharmaceutical composition 401 (not shown). The wall 102 forms from top to bottom in FIG. 1: a top region of the hollow body 100, which consists of a flange 111 and a neck 112; a body region 114, which follows the top region via a shoulder 113; and a bottom region 116, which follows the body region 114 via a heel 115. Here, the body region 114 is a lateral region of the hollow body 100 in form of a hollow cylinder. Thus, a contact range 118 of a height 117 of the hollow body 100 extends throughout the body region 114. Throughout that contact range 118 an exterior diameter 119 of the hollow body 100 has a global maximum. This means, nowhere outside of the body region 114 the hollow body 100 has an exterior diameter 119 which is larger than in the body region 114. The wall 102 comprises a layer of glass 104 and a wall surface 103, wherein the layer of glass 104 extends across the full area of the wall surface 103. The layer of glass 104 consists of a first glass composition. The wall surface 103 consists of an interior surface 108 which faces the interior volume 101, and an exterior surface 109 which faces away from the interior volume 101. Here, the part of the exterior surface 109 which lies in the body region 114 of the hollow body 100 forms a contact region 120 which thus, extends throughout the contact range 118 of the height 117 of the hollow body 100. Further, the contact region 120 is a region of the exterior surface 109 of the hollow body 100 at which the hollow body 100 contacts a further hollow body (not shown), wherein the further hollow body is identical to the hollow body 100, wherein both hollow bodies stand upright on a plane surface, wherein a distance between both hollow bodies has been reduced until both hollow bodies have been brought into contact. Here, the contact region 120 is a cylindrically symmetric region of the exterior surface 109 and thus, the preceding definition is independent from the angle of rotation of the hollow body 100 around an axis along the height 117 of the hollow body 100 with respect to the further hollow body. In case of the hollow body 100 of FIG. 1, the contact region 120 is identical to a surface region 105 of the wall surface 103. The layer of glass 104 forms a base surface 106 which is partially superimposed by a plurality of elevated regions 107 throughout that surface region 105. The elevated regions 107 adjoin the base surface 106 which is a surface of the layer of glass 104. Further, the elevated regions 107 are joined to the base surface 106. Moreover, the elevated regions 107 form a regular pattern of ellipses across the full surface region 105. The elevated regions 107 consist of a further glass composition. The hollow body 100 of FIG. 1 is a vial according to the example 1 above.

Figure 2:
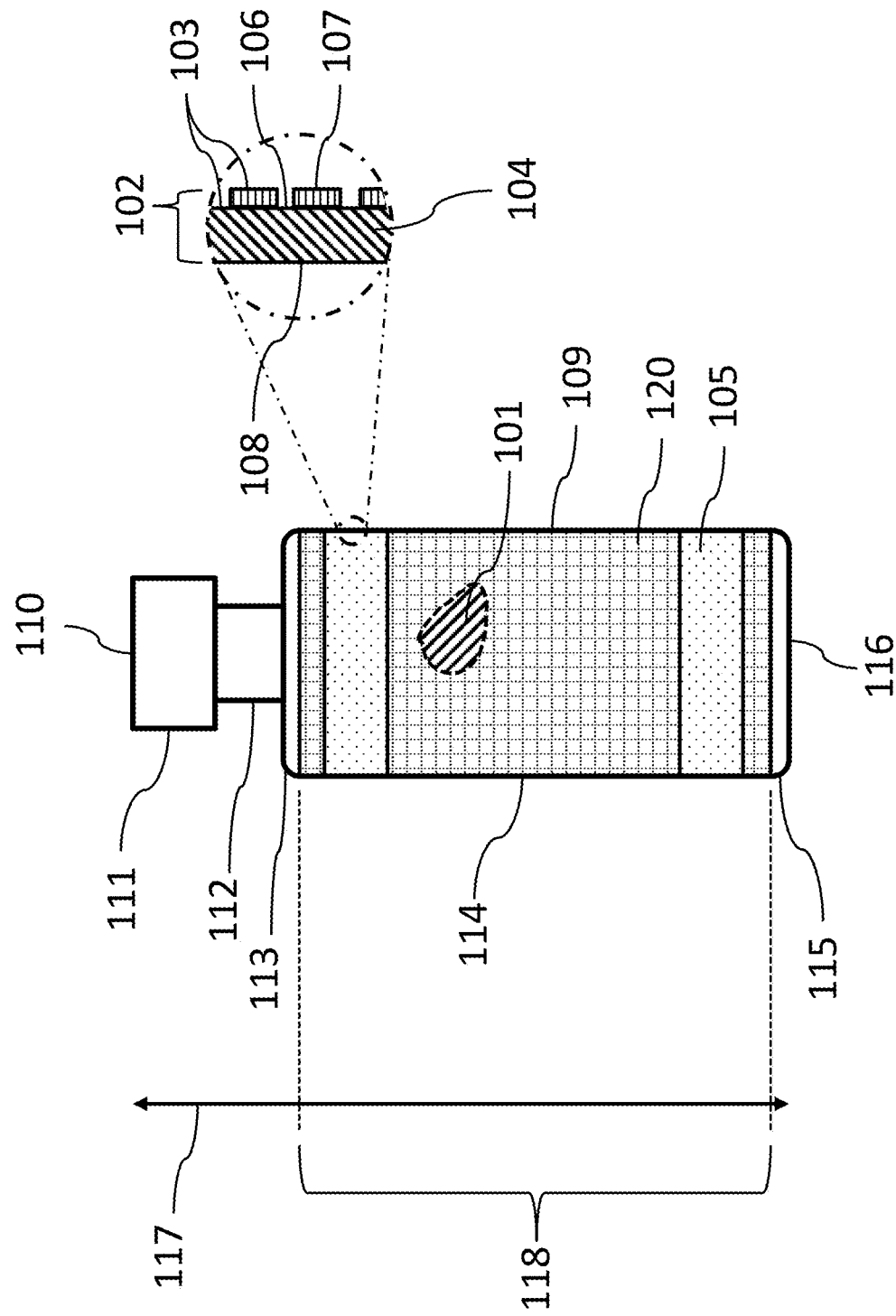
FIG. 2 illustrates a schematic depiction of another exemplary embodiment of a hollow body provided according to the invention.

FIG. 2 shows a schematic depiction of a further hollow body 100 provided according to the invention. The hollow body 100 of FIG. 2 is designed as the hollow body 100 of FIG. 1, except that the hollow body of FIG. 2 has exactly a first and a further surface region 105. Each of these surface regions 105 forms a ring that extends circumferentially around the interior volume 101 of the hollow body 100. Hence, the surface regions 105 are cylindrically symmetric. Both rings lie in the contact region 120 of the exterior surface 109 of the wall 102. Just as the surface region 105 of FIG. 1, the first and the further surface regions 105 of FIG. 2 each comprise a regular pattern of elevated regions 107. The hollow body 100 of FIG. 1 is a vial according to the example 2 above.

Figure 3:
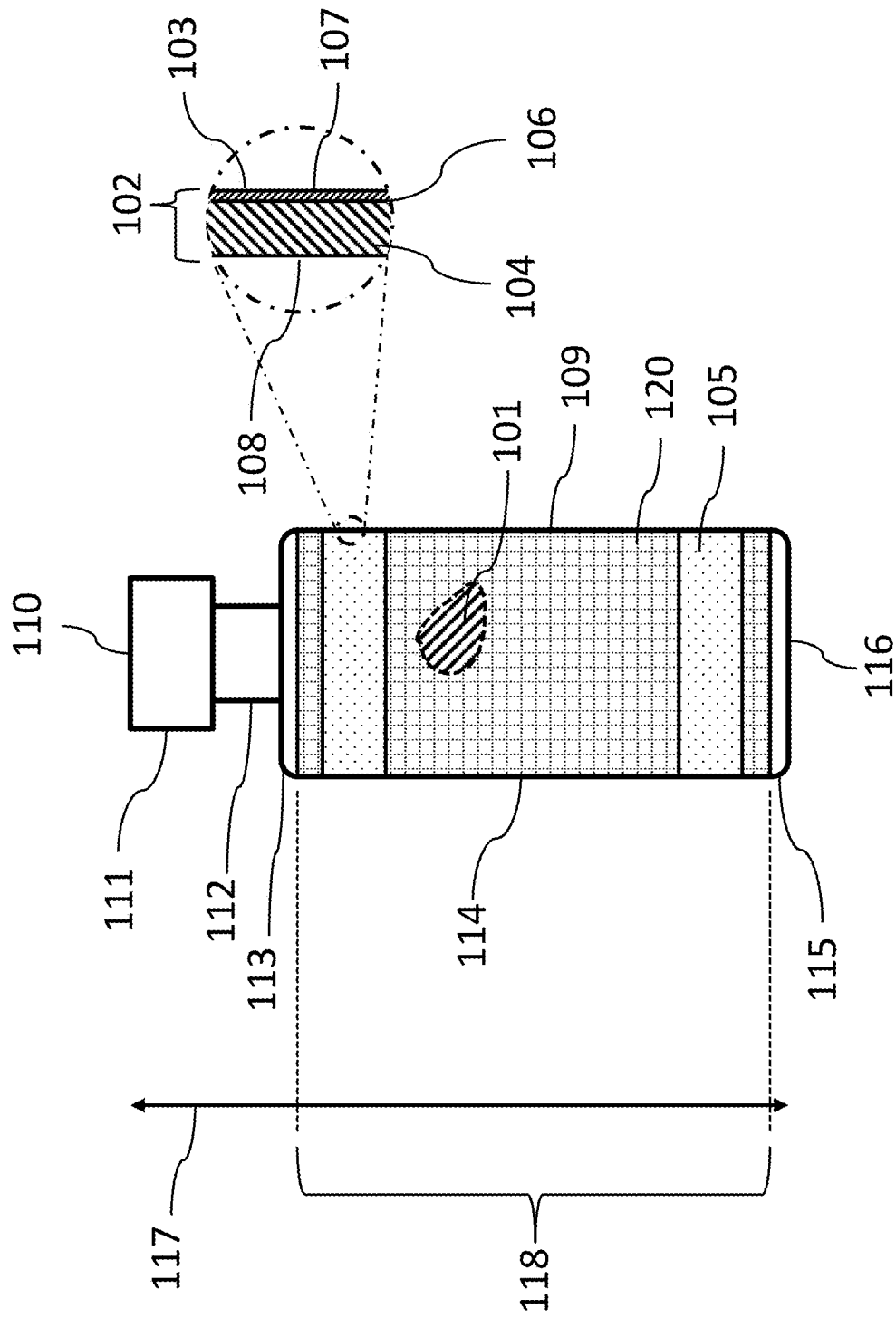
FIG. 3 illustrates a schematic depiction of another exemplary embodiment of a hollow body provided according to the invention.

FIG. 3 shows a schematic depiction of a further hollow body 100 provided according to the invention. The hollow body 100 of FIG. 3 is designed as the hollow body 100 of FIG. 2, except that in both of the surface regions 105 the base surface 106 is fully covered by a single elevated region 107, respectively. The hollow body 100 of FIG. 3 is a vial according to the example 3 above.

Figure 4:
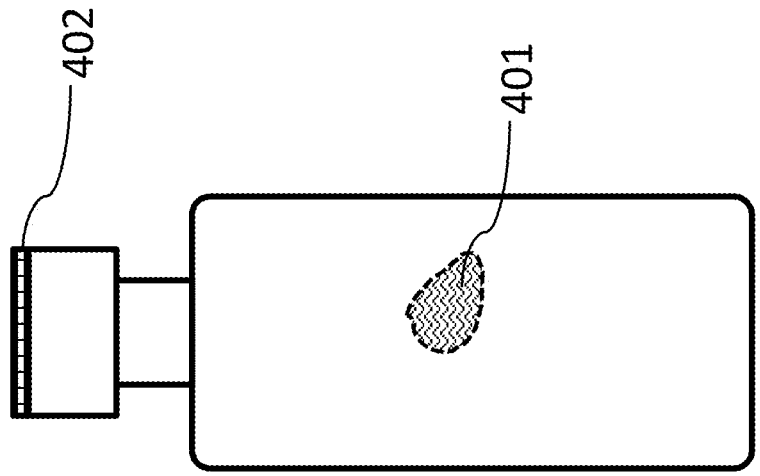
FIG. 4 illustrates a schematic depiction of an exemplary embodiment of a closed hollow body provided according to the invention.

FIG. 4 shows a schematic depiction of a closed hollow body 400 provided according to the invention. This closed hollow body 400 is a vial which has been obtained by filling the hollow body 100 of FIG. 1 with a pharmaceutical composition 401 and closing the opening 110 with a lid 402 via a crimping step. Here, the pharmaceutical composition 401 is a vaccine.

Figure 5:
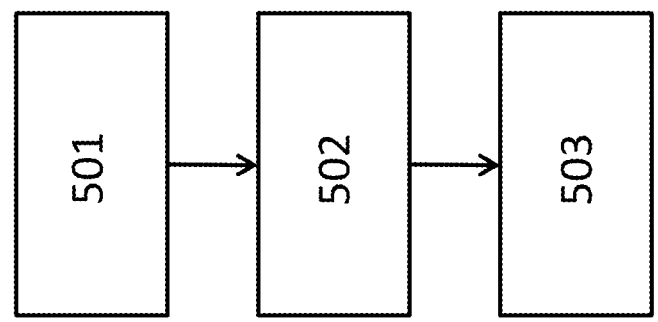
FIG. 5 illustrates a flow chart of an exemplary embodiment of a process provided according to the invention for the preparation of a hollow body.

FIG. 5 shows a flow chart of a process 500 provided according to the invention for the preparation of a hollow body 100. The process 500 comprises a process step a) 501 in which a commercially available glass vial of the type "Vial 2.00 ml Fiolax clear" from Schott AG which of the type 2R according to DIN/ISO 8362 is provided. In a process step b) 502, a composition is applied to the exterior surface 109 of the vial by screen printing and lithography as described in detail above in the context of the example 1 according to the invention. A process step c) 503 of forming a plurality of elevated regions 107 and joining those to the vial surface is as well conducted as described in the context of the example 1 according to the invention. The hollow body 100 of FIG. 1 is obtained through the process 500.

Figure 6:
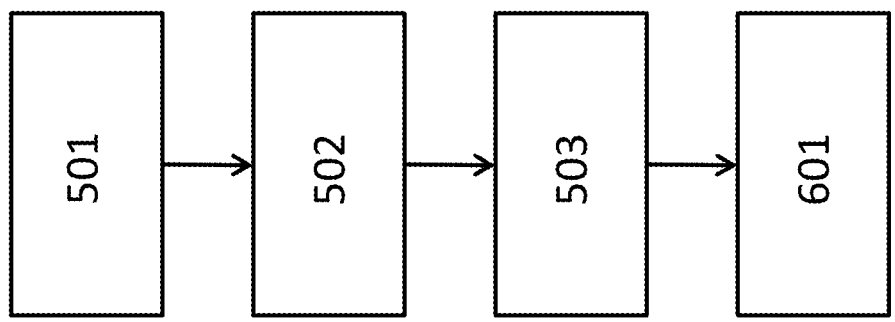
FIG. 6 illustrates a flow chart of another exemplary embodiment of a process provided according to the invention for the preparation of a hollow body.

FIG. 6 shows a flow chart of a further process 600 provided according to the invention for the preparation of a hollow body 100. The process 600 of FIG. 6 comprises the process steps a) 501 to c) 503 of the process 500 according to FIG. 5 and further, a process step d) 601 of depyrogenising the hollow body 100 in accordance with the above described depyrogenation process.

Figure 7:
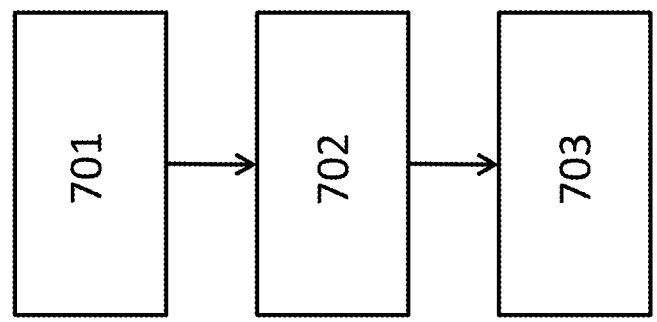
FIG. 7 illustrates a flow chart of an exemplary embodiment of a process provided according to the invention for packaging a pharmaceutical composition.

FIG. 7 shows a flow chart of a process 700 provided according to the invention for packaging a pharmaceutical composition 401. In a process step A) 701, the hollow body 100 according to FIG. 1 is provided. In a process step B) 702, a pharmaceutical composition 401 is filled into the interior volume 101 of the hollow body 100, and in a process step C) 703 the opening 110 of the hollow body 100 is closed, thereby obtaining the closed hollow body 400 of FIG. 4.

Figure 8:
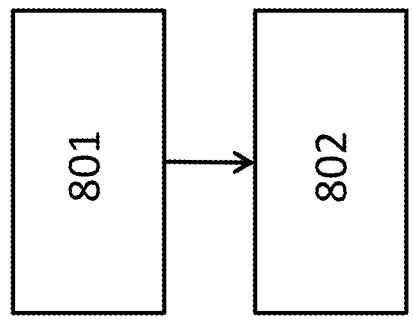
FIG. 8 illustrates a flow chart of an exemplary embodiment of a process provided according to the invention for treating a patient.

FIG. 8 shows a flow chart of a process 800 provided according to the invention for treating a patient. This process 800 comprises the process steps of: A. 801 providing the closed hollow body 400 of FIG. 4, opening the closed hollow body 400 by penetrating the lid 402 with a needle of a syringe, filling the syringe with the vaccine; and B. 802 administering the vaccine subcutaneously to a patient using the syringe.

FIG. 9A shows a microscope image of the result of a scratch test performed on a part of the exterior surface 109 in the body region 114 of a vial of example 1. In the figure, the applied force increases linearly from 0.1 N on the left margin to 30 N on the right margin. The image shows that the elevated regions 107 on the base surface 106 protect the base surface 106, which is a surface of the layer of glass 104, from scratches.

Figure 9B:
FIG. 9B illustrates a microscope image of the result of a scratch test performed on a vial of comparative example 1.

FIG. 9B shows a microscope image of the result of a scratch test performed on the exterior surface of a vial of comparative example 1. In the figure, the applied force increases linearly from 0.1 N on the left margin to 30 N on the right margin.

Figure 9C:
FIG. 9C illustrates a microscope image of the result of a scratch test performed on a vial of comparative example 2.

FIG. 9C shows a microscope image of the result of a scratch test performed on the exterior surface of a vial of comparative example 2. In the figure, the applied force increases linearly from 0.1 N on the left margin to 30 N on the right margin.

Figure 9D:
FIG. 9D illustrates a microscope image of the result of a scratch test performed on a vial of comparative example 3.

FIG. 9D shows a microscope image of the result of a scratch test performed on the exterior surface of a vial of comparative example 3. In the figure, the applied force increases linearly from 0.1 N on the left margin to 30 N on the right margin.

Figure 9E:
FIG. 9E illustrates a microscope image of the result of a scratch test performed on a vial of comparative example 4.

FIG. 9E shows a microscope image of the result of a scratch test performed on the exterior surface of a vial of comparative example 4. In the figure, the applied force increases linearly from 0.1 N on the left margin to 30 N on the right margin.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

LIST OF REFERENCE NUMERALS

100 hollow body according to the invention
101 interior volume
102 wall
103 wall surface
104 layer of glass
105 surface region
106 base surface
107 elevated region
108 interior surface
109 exterior surface
110 opening
111 flange
112 neck
113 shoulder
114 body region
115 heel
116 bottom region
117 height
118 contact range
119 exterior diameter
120 contact region
400 closed hollow body according to the invention
401 pharmaceutical composition
402 lid
500 process according to the invention for the preparation of a hollow body
501 process step a)
502 process step b)
503 process step c)
600 process according to the invention for the preparation of a hollow body
601 process step d)
700 process according to the invention for packaging a pharmaceutical composition
701 process step A)
702 process step B)
703 process step C)
800 process according to the invention for treating a patient
801 process step A.
802 process step B.

What is claimed is:

1. A hollow body, comprising:
a wall which at least partially surrounds an interior volume of the hollow body, the wall comprising a layer of glass comprising a first glass composition, the wall comprising an interior surface that faces the interior volume and an exterior surface opposite the interior surface that faces away from the interior volume, the wall defining a plurality of exterior diameters, the wall defining a maximum exterior diameter in at least one contact region, the maximum exterior diameter extending along at least a portion of a height of the hollow body, wherein at least one elevated region extends from the exterior surface of the wall in the at least one contact region and comprises a further glass composition, wherein the at least one elevated region covers 5% to 90% of the at least one contact region, wherein the at least one elevated region comprises a plurality of spaced apart elevated regions each extending from the exterior surface of the wall in the at least one contact region.

2. The hollow body according to claim 1, wherein at least one of the elevated regions is transparent.

3. The hollow body according to claim 1, wherein at least one of the elevated regions extends along at least 25% of a circumference of the hollow body.

4. The hollow body according claim 1, wherein the hollow body is a packaging container for at least one of a medical packaging good or a pharmaceutical packaging good.

5. The hollow body according to claim 1, wherein the plurality of elevated regions comprises a first elevated region and a further elevated region each extending from the exterior surface of the wall in the at least one contact region, the first elevated region and the further elevated region being spatially distanced by at least 10% of the height of the hollow body.

6. The hollow body according to claim 1, wherein the elevated regions of the plurality of elevated regions each have a diameter in a range from 5 μm to 2500 μm.

7. The hollow body according to claim 1, wherein the first glass composition is different from the further glass composition.

8. The hollow body according to claim 7, wherein the first glass composition has a first softening temperature, the further glass composition has a further softening temperature, and the further softening temperature is less than the first softening temperature.

9. A process for making an item, comprising as process steps:
a) providing a hollow body comprising a wall which at least partially surrounds an interior volume of the hollow body, the wall comprising a layer of glass comprising a first glass composition, the wall comprising an interior surface that faces the interior volume and an exterior surface opposite the interior surface that faces away from the interior volume, the wall defining a plurality of exterior diameters, the wall defining a maximum exterior diameter in at least one contact region, the maximum exterior diameter extending along at least a portion of a height of the hollow body;
b) contacting the exterior surface of the wall in the at least one contact region with a composition comprising a plurality of particles, the particles of the plurality of particles comprising a further glass composition; and
c) forming a plurality of elevated regions each comprising the further glass composition on the exterior surface of the wall in the at least one contact region from the composition and joining the plurality of elevated regions to the exterior surface in the at least one contact region, wherein the plurality of elevated regions covers 5% to 90% of the at least one contact region and comprises spaced apart elevated regions each extending from the exterior surface of the wall in the at least one contact region.

10. A process, comprising:
using a plurality of a plurality of glass particles for functionalizing an exterior surface of a wall of a glass container for packaging a pharmaceutical composition, the glass container comprising the wall which at least partially surrounds an interior volume of the hollow body, the wall comprising a layer of glass comprising a first glass composition, the wall comprising an interior surface that faces the interior volume and the exterior surface opposite the interior surface that faces away from the interior volume, the wall defining a plurality of exterior diameters, the wall defining a maximum exterior diameter in at least one contact region, the maximum exterior diameter extending along at least a portion of a height of the hollow body, the functionalizing comprising:
A} contacting the exterior surface in the at least one contact region with the plurality of glass particles; and
B} forming a plurality of elevated regions each comprising a further glass composition at least in part from the plurality of glass particles and joining the plurality of elevated regions to the exterior surface in the at least one contact region, wherein the plurality of elevated regions covers 5% to 90% of the at least one contact region and comprises spaced apart elevated regions each extending from the exterior surface of the wall in the at least one contact region.

11. The hollow body of claim 1, wherein the plurality of elevated regions is formed as a loop extending about at least a portion of a circumference of the hollow body.

12. A closed hollow body, comprising:
a wall which at least partially surrounds an interior volume of the closed hollow body, the wall comprising a layer of glass comprising a first glass composition, the wall comprising an interior surface that faces the interior volume and an exterior surface opposite the interior surface that faces away from the interior volume, the wall defining a plurality of exterior diameters, the wall defining a maximum exterior diameter in at least one contact region, the maximum exterior diameter extending along at least a portion of a height of the closed hollow body, wherein at least one elevated region extends from the exterior surface of the wall in the at least one contact region and comprises a further glass composition, wherein the at least one elevated region covers 5% to 90% of the at least one contact region, wherein the at least one elevated region comprises a plurality of spaced apart elevated regions each extending from the exterior surface of the wall in the at least one contact region.

13. The closed hollow body of claim 12, further comprising a pharmaceutical composition in the interior volume.

14. A process, comprising as process steps:
A) providing a hollow body comprising:
a wall which at least partially surrounds an interior volume of the hollow body, the wall comprising a layer of glass comprising a first glass composition, the wall comprising an interior surface that faces the interior volume and an exterior surface opposite the interior surface that faces away from the interior volume, the wall defining a plurality of exterior diameters, the wall defining a maximum exterior diameter in at least one contact region, the maximum exterior diameter extending along at least a portion of a height of the hollow body, wherein at least one elevated region extends from the exterior surface of the wall in the at least one contact region and comprises a further glass composition, wherein the at least one elevated region covers 5% to 90% of the at least one contact region, wherein the at least one elevated region comprises a plurality of spaced apart elevated regions each extending from the exterior surface of the wall in the at least one contact region;
B) inserting a pharmaceutical composition into the interior volume; and
C) closing the hollow body.

* * * * *